US011885465B2

(12) United States Patent
Minas

(10) Patent No.: US 11,885,465 B2
(45) Date of Patent: Jan. 30, 2024

(54) SYSTEMS FOR REFUELING CRYO-COMPRESSED HYDROGEN TANKS AND METHODS FOR OPERATING THE SAME

(71) Applicant: General Electric Company, Schenectady, NY (US)

(72) Inventor: Constantinos Minas, Slingerlands, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/741,184

(22) Filed: May 10, 2022

(65) Prior Publication Data

US 2023/0366513 A1    Nov. 16, 2023

(51) Int. Cl.
*F17C 6/00* (2006.01)
*F17C 13/04* (2006.01)

(52) U.S. Cl.
CPC .............. *F17C 6/00* (2013.01); *F17C 13/04* (2013.01); *F17C 2205/0323* (2013.01); *F17C 2205/0338* (2013.01); *F17C 2205/0355* (2013.01); *F17C 2221/012* (2013.01); *F17C 2227/0135* (2013.01); *F17C 2250/032* (2013.01); *F17C 2250/043* (2013.01); *F17C 2250/0439* (2013.01); *F17C 2250/0443* (2013.01); *F17C 2250/0636* (2013.01); *F17C 2270/0189* (2013.01)

(58) Field of Classification Search
None
See application file for complete search history.

(56) References Cited

U.S. PATENT DOCUMENTS 4,821,907 A    4/1989 Castles et al.
4,961,325 A    10/1990 Halvorson et al.
(Continued)

FOREIGN PATENT DOCUMENTS

WO    WO-2017040550 A1 *    3/2017    .............. F17C 13/02

OTHER PUBLICATIONS

European Patent Office, "Extended European Search Report," dated Oct. 13, 2023, in connection with European Patent Application No. 23151839.0, 7 pages.

*Primary Examiner* — Timothy P. Kelly
*Assistant Examiner* — Christopher M Afful
(74) *Attorney, Agent, or Firm* — HANLEY, FLIGHT & ZIMMERMAN, LLC

(57) ABSTRACT

An apparatus to refuel a vessel with cryo-compressed hydrogen is disclosed herein. The apparatus includes a refueler controller configured to defuel the vessel prior to a refuel process based on a pressure of the vessel; fill a mixing tank with at least the cryo-compressed hydrogen based on the pressure of the vessel and a pressure of the mixing tank, wherein the mixing tank is connected upstream of the vessel and is structured to include the cryo-compressed hydrogen; initiate the refuel process of the vessel; adjust a temperature of the mixing tank in response to a temperature of the vessel not satisfying a target temperature of the vessel during the refuel process, wherein the temperature of the mixing tank is to be adjusted based on an increase or a decrease of flow of supercritical hydrogen; and end the refuel process in response to the pressure of the vessel satisfying a target pressure of the vessel.

20 Claims, 10 Drawing Sheets

(56) References Cited

U.S. PATENT DOCUMENTS

| | | |
|---|---|---|
| 5,582,016 A | 12/1996 | Gier et al. |
| 7,810,669 B2 | 10/2010 | Westenberger |
| 8,430,237 B2 | 4/2013 | Westenberger et al. |
| 9,784,410 B2 | 10/2017 | Brunner et al. |
| 9,982,843 B2 | 5/2018 | Kawai |
| 10,082,246 B2 | 9/2018 | Aceves et al. |
| 10,260,678 B2 | 4/2019 | Christ |
| 2009/0308083 A1 | 12/2009 | Brunner |
| 2010/0236259 A1 | 9/2010 | Brunner et al. |
| 2013/0299501 A1 | 11/2013 | Lee et al. |
| 2014/0026597 A1 | 1/2014 | Epstein et al. |
| 2016/0348841 A1 | 12/2016 | Jones et al. |
| 2021/0340908 A1 | 11/2021 | Boucher et al. |
| 2022/0009648 A1* | 1/2022 | Clarke .............. H01M 8/04201 |

* cited by examiner

SYSTEMS FOR REFUELING CRYO-COMPRESSED HYDROGEN TANKS AND METHODS FOR OPERATING THE SAME

FIELD OF THE DISCLOSURE

This disclosure relates generally to refueling fuel tanks, and, more particularly, to systems for refueling hydrogen tanks and methods for operating the same.

BACKGROUND

In recent years, hydrogen-powered vehicles (e.g., automotives, aircraft, buses, ships, etc.) have become more prevalent. As such, advancements in hydrogen storage tanks and refueling measures for such tanks are ever increasing. A typical liquid hydrogen (LH2) refueling system includes a supply tank and/or trailer, a flow control valve, a volumetric flowmeter, a cryogenic valve, and vacuum jacketed flowlines. Along with the onboard LH2 tank(s), some hydrogen-powered vehicles (e.g., aircraft) include a cryogenic pump or other mechanism(s) to supply gaseous hydrogen (GH2) to engine(s) for combustion and power generation. Some hydrogen-powered vehicles include onboard cryo-compressed hydrogen (CcH2) tank(s) to store hydrogen in a supercritical state (e.g., supercritical gas) at pressures higher than LH2 tanks but at similar densities. For example, CcH2 tanks can store CcH2 with densities ranging from 36 kilograms per cubic meter ($kg/m^3$) to 83 $kg/m^3$, pressures ranging from 100 bar to 350 bar, and cryogenic temperatures ranging from 40 Kelvin (K) to 70 K.

BRIEF DESCRIPTION OF THE DRAWINGS

A full and enabling disclosure of the preferred embodiments, including the best mode thereof, directed to one of ordinary skill in the art, is set forth in the specification, which makes reference to the appended Figures, in which.

Figure 1:
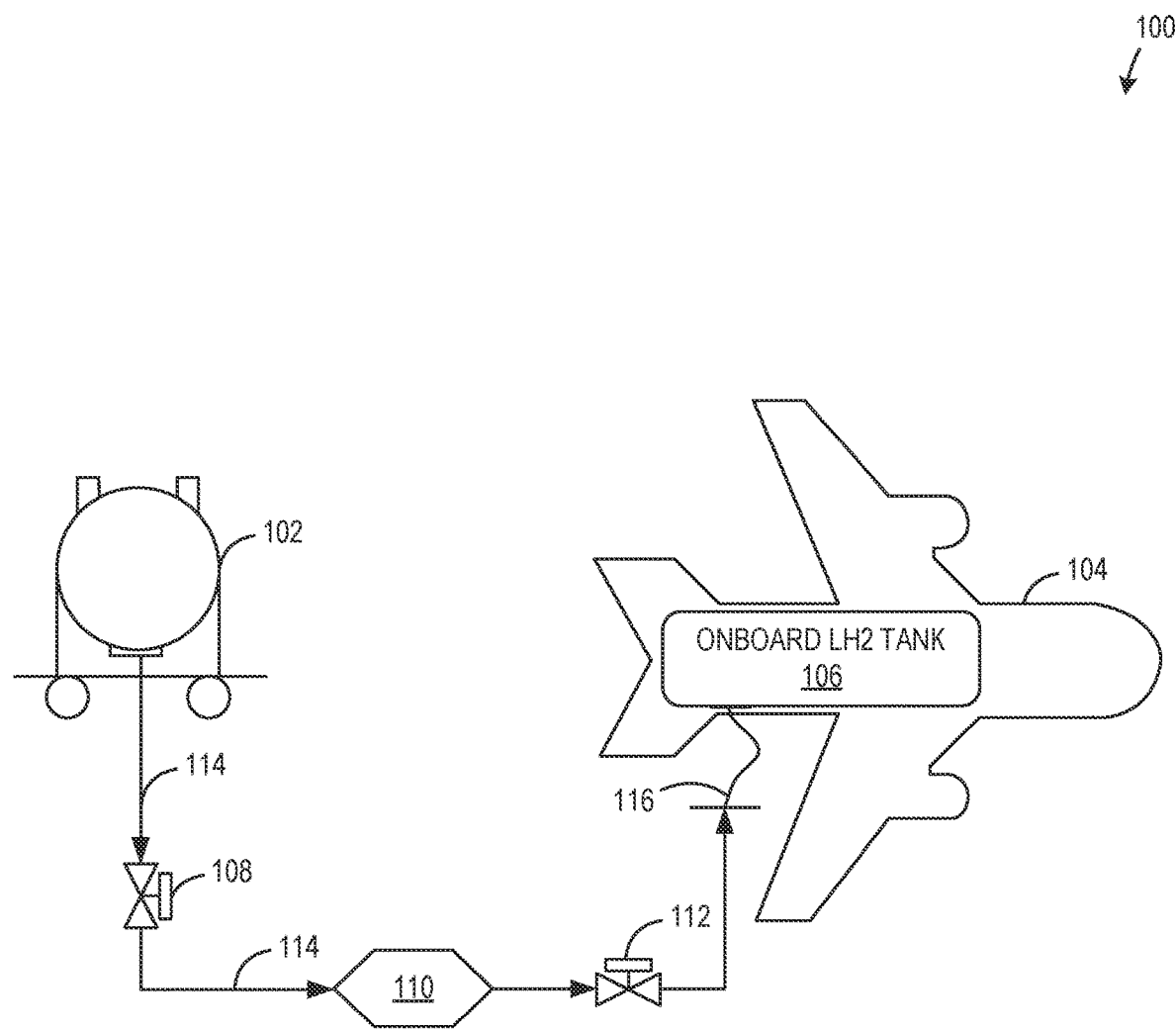
FIG. 1 illustrates a known system for refueling liquid hydrogen (LH2) fuel tanks.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, joined, detached, decoupled, disconnected, separated, etc.) are to be construed broadly and may include intermediate members between a collection of elements and relative movement between elements unless otherwise indicated. As used herein, the term "decouplable" refers to the capability of two parts to be attached, connected, and/or otherwise joined and then be detached, disconnected, and/or otherwise non-destructively separated from each other (e.g., by removing one or more fasteners, removing a connecting part, etc.). As such, connection/disconnection references do not necessarily infer that two elements are directly connected and in fixed relation to each other. Stating that any part is in "contact" with another part means that there is no intermediate part between the two parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

The operations of systems for refueling a hydrogen-powered vehicle (e.g., aircraft, cars, trucks, ships, etc.) with liquid hydrogen (LH2) include an LH2 supply tank (e.g., on a supply truck/trailer) often of the same structure or functionality as onboard LH2 tank(s). The refueling system uses a pump and other apparatus to provide the hydrogen aircraft with the LH2 at a correct temperature and saturated pressure. Some vehicles or machines, such as other hydrogen aircraft, spacecraft, municipal power, etc. use cryo-compressed hydrogen (CcH2) tank(s) instead of LH2 tank(s) to store the hydrogen fuel for power generation. In some examples used herein, "cryo-compressed hydrogen" refers to hydrogen (e.g., LH2, gaseous hydrogen (GH2), hydrogen vapor, etc.) that has been compressed to pressures greater than a critical point of hydrogen (e.g., 13 bar) while at cryogenic temperatures (e.g. 40 K to 70 K). For example, upon reaching such pressures and temperatures, LH2 phase shifts into a supercritical fluid and can then be referred to as CcH2. Some hydrogen aircraft include onboard CcH2 tank(s) instead of onboard LH2 tank(s) so that a cryogenic pump is not included on the aircraft. Rather, the CcH2 is already highly compressed (e.g., up to 350 bar) in the onboard CcH2 tank(s) and can be provided to the engines for combustion via a pressure-driven fuel supply system. Including the onboard CcH2 tank(s) without the cryogenic pump can save weight and space on the hydrogen aircraft compared to the other hydrogen aircraft that include the onboard LH2 tank(s) and the LH2 pump. The examples disclosed herein include systems for refueling CcH2 tank(s) onboard a vehicle (e.g., a hydrogen aircraft, a spacecraft, or another vehicle that uses CcH2 fuel) or integrated into a power generation facility (e.g., a municipal power plant that uses CcH2 fuel) up to a target pressure and temperature such that the target pressure and temperature are achieved together and the CcH2 does not convert back into LH2.

In the examples disclosed herein, the CcH2 refueling systems can be used to refuel onboard CcH2 tank(s) and/or other example CcH2 tank(s), vessel(s), and/or container(s) up to the target pressure while controlling the temperature in the example CcH2 tanks. During a refuel process with the example CcH2 refueling systems, a reverse Joule-Thomson effect of hydrogen causes the temperature of CcH2 in portions of the CcH2 refueling systems and in the CcH2 tanks to decrease. In thermodynamics, the Joule-Thomson effect describes a temperature change of a real gas that occurs while the real gas flows from a high pressure area to a low pressure area through an orifice, otherwise known as throttling. At room temperature and with constant enthalpy, hydrogen warms upon expansion due to the Joule-Thomson effect. However, at cryogenic temperatures (e.g., CcH2 temperatures of 40 K, 50 K, 70 K, etc.), the Joule-Thomson effect of hydrogen reverses causing hydrogen to cool upon expansion. In the examples disclosed herein, the CcH2 refueling systems include valves (e.g., proportional valves, regulator valves, cryogenic valves, etc.) that throttle the CcH2 fuel causing expansion and cooling of the CcH2 downstream of the valves and in the example CcH2 tanks. The examples disclosed herein include CcH2 refueling systems that introduce gaseous hydrogen to the CcH2 fuel during the refuel process to controllably warm the CcH2 fuel and counteract the reverse Joule-Thomson effect of CcH2.

The example CcH2 refueling systems disclosed herein include a CcH2 refueler, a CcH2 source, and a supercritical hydrogen (sH2) source to refuel a CcH2 tank and/or vessel (e.g., onboard an aircraft, onboard a spacecraft, integrated into a municipal power system, etc.) up to a target pressure at a target temperature. The example CcH2 source can include a cryogenic pump to cryogenically compress LH2 into CcH2. Additionally or alternatively, the example CcH2 source can include or a CcH2 supply tank. The example sH2 source can include a vaporizer to warm a portion of the CcH2 fuel up to near ambient temperatures (e.g., 310 K when the ambient temperature is 313 K, or 230 K when the ambient temperature is 233 K). Additionally or alternatively, the example sH2 source can include hydrogen storage tanks capable of storing hydrogen at high pressures (e.g., 20 bar or greater) and near ambient temperatures such that the sH2 can be kept in the supercritical state. In the examples disclosed herein, the CcH2 refueler includes a mixing tank to combine CcH2 from the CcH2 source and sH2 from the sH2 source prior to fueling the CcH2 tank with the CcH2 fuel. The example CcH2 refueler controller causes an adjustment to the flowrate of sH2 entering the mixing tank to control the temperature of the CcH2 fuel being supplied to the CcH2 tank. For example, when the temperature of the CcH2 tank does not satisfy a target temperature (e.g., when the temperature falls below 40 K), then the CcH2 refueler controller causes the flowrate of sH2 into the mixing tank to increase until the temperature of the CcH2 tank satisfies the target temperature or until a temperature of the mixing tank satisfies the target temperature (e.g., or a target temperature of the mixing tank).

In some examples used herein, "saturated pressure" refers to a vapor pressure acting on the walls of a tank (e.g., a LH2 supply tank and/or an onboard LH2 tank) and the surface of a liquid (e.g., LH2) within the tank when the vapor is in equilibrium with the liquid. That is, when the temperature of the liquid remains relatively constant and does not increase enough to cause further evaporation, the vapor is considered to be in equilibrium with the liquid. The example onboard CcH2 tank 206 is referred to store CcH2 at a "pressure" rather than at a "saturated pressure" because the CcH2 within the onboard CcH2 tank 206 is a supercritical fluid with no LH2 present.

In some examples used herein, "upstream" and "downstream" refer to the relative direction with respect to fluid flow in a fluid pathway. The term "upstream" refers to the direction from which the fluid flows, and "downstream" refers to the direction to which the fluid flows. For example, if a system includes a pump and a flowmeter, and the flowmeter measures a flowrate of fluid exiting the pump, then the flowmeter is downstream of the pump, and the pump is upstream of the flowmeter.

In some examples used herein, "including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

For the figures disclosed herein, identical numerals indicate the same elements throughout the figures. The example illustration of FIG. 1 is a block diagram representing a prior LH2 refueling system 100. As shown in FIG. 1, the LH2 refueling system 100 ("system 100") includes an example LH2 supply tank 102, an example hydrogen aircraft 104, an example onboard LH2 tank 106, an example proportional valve 108, an example flowmeter 110, and an example refueler valve 112 connected in series via example vacuum-jacketed (VJ) flowlines 114 and example flexible VJ flowline(s) 116. In general, the system 100 is configured to supply LH2 to the onboard LH2 tank 106 at a same temperature and pressure as is in the LH2 supply tank 102.

The example system 100 illustrated in FIG. 1 includes the LH2 supply tank 102 to provide LH2 fuel to the example hydrogen aircraft 104 at a known temperature and pressure. The example LH2 supply 102 tank can be included on a trailer of a LH2 supply truck for mobile delivery of the fuel. In some examples, the LH2 supply tank 102 is stationary and positioned near an expected docking area of the aircraft 104. During storage, the LH2 temperature may increase, some LH2 may boil-off/evaporate, and, therefore, pressure in the LH2 supply tank 102 may increase. In some examples, the LH2 supply 102 includes venting mechanisms to release hydrogen vapor and reduce pressure build up caused from boil-off. The example LH2 supply tank 102 can also include insulating materials and/or insulating structures (e.g., a vacuum layer between an inner shell and an outer shell) to maintain cryogenic temperatures of the LH2 and limit excessive boil-off.

The example system 100 illustrated in FIG. 1 includes the onboard LH2 tank 106 to store LH2 fuel on the example aircraft 104. In some examples, the onboard LH2 tank 106 of the example aircraft 104 includes similar or same structures and functionalities as the LH2 supply tank 102. The example onboard LH2 tank 106 includes two different states of hydrogen (e.g., LH2 and GH2), and gradual evaporation of the LH2 causes the saturated pressure of the onboard LH2 tank 106 to increase. In some examples, the onboard LH2 tank 106 includes one or more venting mechanisms to control rising saturated pressures due to boil-off and to satisfy a saturated pressure threshold of the onboard LH2 tank 106.

In some examples, the aircraft 104 includes a cryogenic pump (e.g., an LH2 pump) to supply LH2 fuel to other components of the fuel supply line (e.g., heat exchangers, compressors, buffer tanks, etc.) and ultimately to the combustor(s) of the engine(s). Since the saturated pressure in the example onboard LH2 tank 106 has a limited range (e.g., one bar to ten bar), the internal saturated pressure is not enough to drive the LH2 fuel through the fuel supply line. Hence, the cryogenic pump is included with the example onboard LH2 tank 106 to send the LH2 to a heat exchanger and/or a compressor causing a phase change to GH2. Then, the GH2 can be further supplied, via the cryogenic pump and/or another pump, to the combustor(s) as fuel.

The example system 100 illustrated in FIG. 1 includes the proportional valve 108 to control the flowrate of the LH2 fuel through the system 100. In some examples, the proportional valve 108 is a servo valve that can be hydraulically or electronically actuated via a signal (e.g., digital or analog) to generate an effective outlet area. Standard control valves generally operate in fully open or fully closed states of flow. The example proportional valve 108 can adjust a position of a spool to control the flowrate of the LH2 through one or more outlet flowlines. The pressure of the LH2 upstream and downstream of the example proportional valve 108 remains unchanged but the mass flowrate and volumetric flowrate of the LH2 can be varied depending on a desired refuel rate. The example proportional valve 108 can operate at working temperatures lower than 233 K and can regulate flow of cryogenic fluids (e.g., liquefied natural gas, liquid oxygen, LH2, etc.). The example proportional valve 108 is constructed to thermally insulate the LH2 fuel during transmission to prevent or inhibit boil-off. In some examples, the proportional valve 108 is connected to upstream component(s) and/or downstream component(s) via one or more VJ flowlines 114 and/or one or more flexible VJ flowlines 116.

The example system 100 illustrated in FIG. 1 includes the flowmeter 110 to detect the flowrate of LH2 through the system 100. In some examples, the flowmeter 110 is a volumetric flowmeter that can detect the volume of LH2 that flows per unit of time. In some examples, the flowmeter 110 measures the velocity of the flow of the LH2 and multiplies the velocity by the cross-sectional area of the flowline where the flowmeter 110 is located. The example flowmeter 110 can also determine a total volume of LH2 currently supplied to the onboard LH2 tank 106. For example, the flowmeter 110 measures a current flowrate of the LH2, and, in response to the current flowrate not satisfying a target flowrate, the system 100 causes the proportional valve 108 to increase the effective outlet area. In another example, the flowmeter 110 determines a current total volume of LH2 in the onboard LH2 tank 106, and, in response to the current total satisfying a target total volume, the system 100 ends the refueling process of the LH2 fuel.

The example system 100 illustrated in FIG. 1 includes the refueler valve 112 to start or stop the flow of LH2 to the onboard LH2 tank 106. The example refueler valve 112 is a cryogenic valve that can operate at working temperatures lower than 233 K and can regulate flow of cryogenic fluids. The example refueler valve 112 is constructed to thermally insulate the LH2 fuel during transmission to prevent or inhibit boil-off. In some examples, the refueler valve 112 is connected to upstream component(s) and/or downstream component(s) via one or more VJ flowlines 114 and/or one or more flexible VJ flowlines 116.

The example refueler valve 112 illustrated in FIG. 1 can be a gate valve, butterfly valve, solenoid valve, etc. manually operated or electronically actuated. In some examples, the refueler valve 112 operates in either to opened or to closed states to fully allow or fully prevent flow of fuel. In some examples, the refueler valve 112 is a shut-off valve to quickly terminate flow to the onboard LH2 tank 106 such that the onboard LH2 tank 106 does not overfill. In some examples, the refueler valve 112 is a proportional valve that adjusts the outlet flowrate based on fluctuating upstream pressures, temperatures, densities, etc.

The example system 100 illustrated in FIG. 1 includes the VJ flowlines 114 and the flexible VJ flowline(s) 116 to connect the components of the system 100. In some examples, the VJ flowlines 114 illustrated in the figures disclosed herein are rigid, flexible, and/or a combination thereof. The example VJ flowlines 114 and flexible VJ flowline(s) 116 are designed with an inner line, an outer line, and an intermediary layer. The example intermediary layer can include multiple alternating layers of a heat barrier and a non-conductive spacer to form gap between the inner line and the outer line. The example intermediary layer can be depressurized using a vacuum pump to create a static vacuum shield. The example vacuum shield can safeguard the cryogenic fuel from heat transfer caused by radiation, conduction, and/or convection. Thus, the VJ flowlines 114 and the flexible VJ flowline(s) 116 are used to transport the example LH2 in the example system 100 to maintain cryogenic temperatures and to prevent or inhibit boil-off. In some examples, the VJ flowlines 114 and flexible VJ flowline(s) 116 include VJ valves, vapor vents, vapor vent heaters, VJ manifolds, etc., to further control the temperatures of the LH2 fuel.

As described previously, the example onboard LH2 tank 106 is located on the example hydrogen aircraft 104 to store LH2 fuel for hydrogen-powered turbine engine(s). The example hydrogen-powered turbine engine(s) combust a mixture of compressed hydrogen and compressed air and/or oxygen to generate thrust. The example aircraft 104 may also include a cryogenic pump (e.g., an LH2 pump) to drive a fuel supply system and compress the LH2 leaving the onboard LH2 tank 106. In the examples disclosed herein, CcH2 refueling systems are used to supply an example vehicle (e.g., an aircraft, car, truck, etc.) with CcH2 fuel without including the cryogenic pump onboard the example vehicle, thus conserving weight and space.

The example system 100 illustrated in FIG. 1 refuels the hydrogen aircraft 104 with LH2 at conditions similar to the temperature and pressure within the LH2 supply tank 102. That is, the system 100 cannot control a pressure or temperature of the LH2 fuel during a refueling process of the aircraft 104. Thus, the system 100 cannot increase the LH2 fuel's density relative to the density in the LH2 supply tank 102, nor can the system 100 increase the mass of fuel supplied to the aircraft 104. Furthermore, the system 100 can only refuel the onboard LH2 tank 106 with LH2 fuel. Since the system 100 refuels the example hydrogen aircraft 104 with LH2 fuel, the aircraft 104 includes an onboard cryogenic pump to pressurize a fuel system and provide LH2 fuel to the engines. In the examples disclosed herein, CcH2 refueling systems can refuel an onboard hydrogen tank with CcH2 fuel up to a pressure threshold and at a controlled temperature. Thus, the example CcH2 refueling systems disclosed herein can increase a density of the CcH2 during the refuel process and, thus, increase the mass of CcH2 fuel supplied relative to the mass of LH2 fuel the system 100 can supply. Furthermore, the example CcH2 refueling systems disclosed herein can supply CcH2 at high pressures (e.g., 100 bar to 350 bar) such that the pressure in the onboard hydrogen tank is enough to pressurize a fuel system to provide CcH2 fuel to the engines without the use of a cryogenic pump. Thus, the example CcH2 systems disclosed herein can control a mass of CcH2 fuel supplied to a hydrogen vehicle (e.g., a hydrogen aircraft), control a temperature of the CcH2 fuel (e.g., to prevent a phase shift back to LH2), and can pressurize an onboard hydrogen tank such that an onboard cryogenic pump is not included, and onboard space and weight is conserved.

Figure 2:
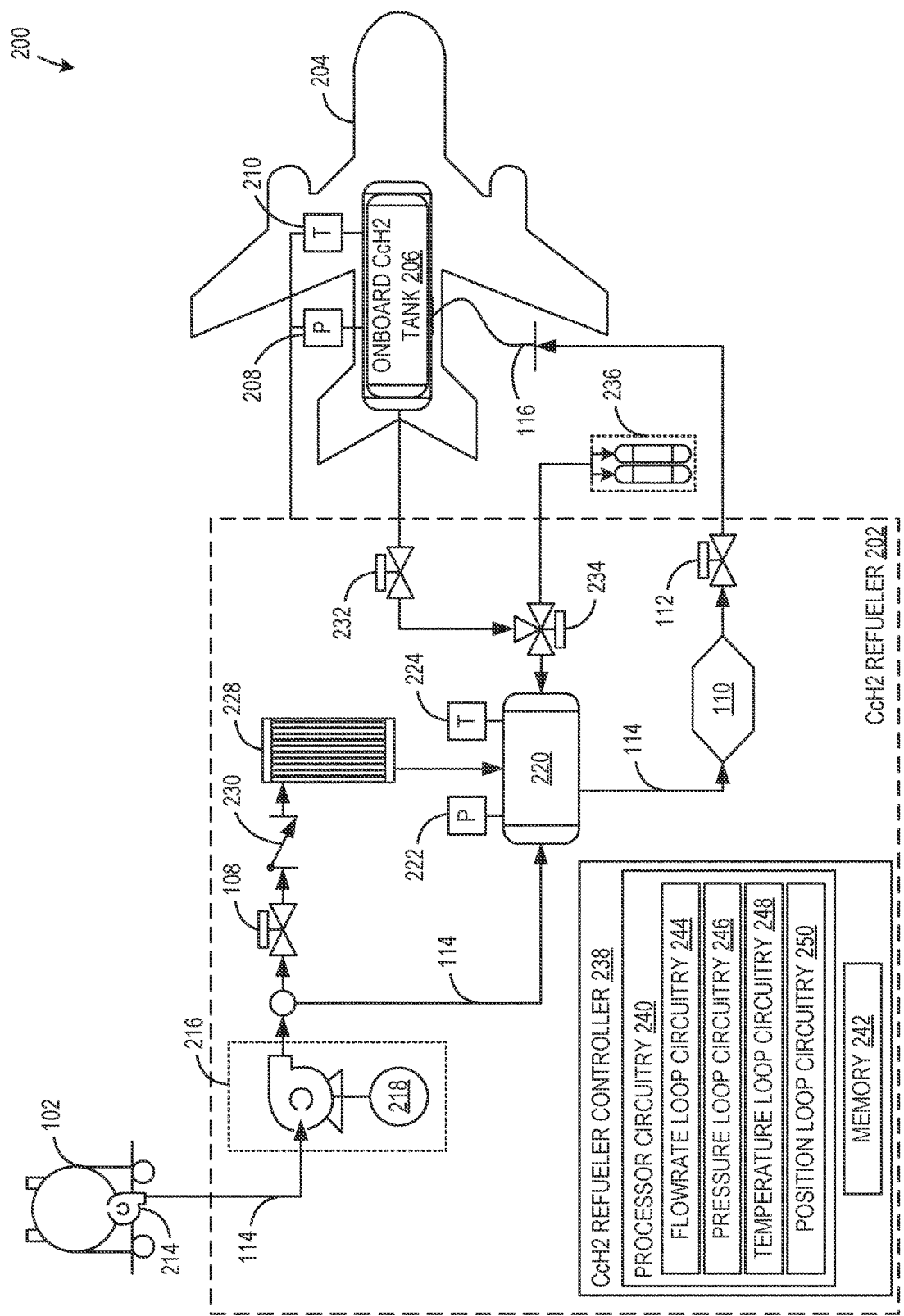
FIG. 2 illustrates a first example cryo-compressed hydrogen (CcH2) refueling system in accordance with the teachings of this disclosure.

FIG. 2 illustrates a first example CcH2 refueling system 200 ("system 200") to supply CcH2 fuel to an example vehicle up to the target onboard pressure while also achieving a controlled and/or consistent temperature. The example system 200 includes the example LH2 supply tank 102, the example proportional valves 108, the example flowmeter 110, the example refueler valve 112, the example VJ flowlines 114, and the example flexible VJ flowline(s) 116 as illustrated in FIG. 1. As illustrated in FIG. 2, the example system 200 further includes an example CcH2 refueler 202, an example hydrogen aircraft 204, an example onboard CcH2 tank 206, an example first pressure sensor 208, and an example first temperature sensor 210, and an example transfer pump 214. The example CcH2 refueler 202 of the example system 200 includes an example cryogenic pump 216, an example pump motor 218, an example mixing tank 220, an example second pressure sensor 222, an example second temperature sensor 224, an example vaporizer 228, an example check valve 230, an example defueler valve 232, an example split valve 234, example hydrogen containers 236, an example CcH2 refueler controller 238, example processor circuitry 240, example memory 242, example flowrate loop circuitry 244, example pressure loop circuitry 246, example temperature loop circuitry 248, and example position loop circuitry 250. For the figures disclosed herein, a portion of the flowlines are labeled as VJ flowlines 114. However, some or all of the flowlines illustrated in the figures disclosed herein may be the VJ flowlines 114, except ones labeled as the flexible VJ flowline 116.

The example system 200 illustrated in FIG. 2 includes the example hydrogen aircraft 204 as the vehicle to be refueled with CcH2 fuel via the example CcH2 refueler 202. Although FIG. 2 depicts the hydrogen aircraft 204, a different vehicle (e.g., a hydrogen-powered car, truck, boat, ship, helicopter, rocket engine, etc.) or standalone CcH2 tank may be refueled with CcH2 fuel via the system 200. In some examples, the hydrogen aircraft 204 is to be refueled after a flight in which a portion of the CcH2 fuel (e.g., some, all, a majority of, etc.) has been used to provide energy to the hydrogen aircraft 204. Thus, a portion of unused CcH2 fuel may be included in the aircraft 204, and the example CcH2 refueler 202 can defuel the aircraft 204 prior to the refueling process. The example hydrogen aircraft 204 includes fuel lines, pumps, valves, etc. to supply the fuel to hydrogen engine(s). Once at the engine(s), combustor(s) can oxidize and burn the hydrogen fuel, which causes an exothermic reaction, provides energy to the turbines, and generates thrust.

The example system 200 illustrated in FIG. 2 includes the example onboard CcH2 tank 206 to store the CcH2 fuel on the hydrogen aircraft 204. The example onboard CcH2 tank 206 can store CcH2 at pressures higher than the pressure limits of LH2 tanks (e.g., the LH2 supply tank 102 and the onboard LH2 tank 106 of FIG. 1). For example, the onboard CcH2 tank 206 stores CcH2 at pressures ranging from 100 bar to 350 bar with a factor of safety (e.g., 1.5, 3, 10, etc.) included. In contrast, the example onboard LH2 tank 106 can store LH2 at saturated pressures ranging from one bar to ten bar with the same or a similar factor of safety. The CcH2 inside the example onboard CcH2 tank 206 does not experience boil-off like the LH2 inside LH2 storage tanks (e.g., the LH2 supply tank 102 and the onboard LH2 tank 106 of FIG. 1) because the example onboard CcH2 tank 206 includes supercritical CcH2. Therefore, instead of including a venting mechanism, the example onboard CcH2 tank 206 can release CcH2 fuel into a fuel supply system to control internal pressure of the onboard CcH2 tank 206. Unlike the example onboard LH2 tank 106, as described previously, the CcH2 fuel can be driven through the fuel supply system and components (e.g., heat exchangers, compressors, buffer tanks, etc.) via the internal pressure (e.g., 100 bar to 350 bar) of the onboard CcH2 tank 206 alone, without reliance on an onboard LH2 pump. As the onboard CcH2 tank 206 releases CcH2, the internal temperature can increase due to thermal losses, which can be desirable for maintaining a constant pressure of the onboard CcH2 tank 206 (e.g., isobaric) as the CcH2 fuel is released. In some examples, when the thermal losses are not enough to keep the onboard CcH2 tank 206 isobaric, the onboard CcH2 tank 206 includes a heater to further increase the internal temperature and, in turn, keep the internal pressure constant.

In some examples, the onboard CcH2 tank 206 can store CcH2 at a density similar to the density of LH2 in the example onboard LH2 tank 106, but at different pressures and temperatures. For example, the onboard CcH2 tank 206 stores CcH2 at a density of 64.2 kg/m$^3$ at a pressure of 300 bar and a temperature of 70 K, while the onboard LH2 tank 106 stores the LH2 at the same density but at a saturated pressure of 3.4 bar and a temperature of 25 K. In some examples, the onboard CcH2 tank 206 is a dual wall cryostat including an inner cryovessel and an outer vacuum vessel. The example cryovessel of the onboard CcH2 tank 206 includes a thicker wall than that of the example onboard LH2 tank 106, but the example vacuum vessel of the onboard CcH2 tank 206 is of the same wall thickness as that of the onboard LH2 tank 106 because the vacuum vessels of the two tanks 106, 206 are designed for the same pressure differential (e.g., 0.5 atmosphere(atm), 0.25 atm, 1 atm, etc.). In some examples, both the cryovessel and the vacuum vessel of the onboard CcH2 tank 206 are type-3 vessels, which include an aluminum liner fully wrapped with a fiber-resin composite.

The example system 200 illustrated in FIG. 2 includes the example first pressure sensor 208 and the example first temperature sensor 210 to monitor the pressure and temperature of the CcH2 inside the onboard CcH2 tank 206 during the refueling process. In some examples, the first pressure sensor 208 is a cryogenic pressure transducer that can operate in temperatures ranging from 40 K to 70 K and pressures ranging from 0 bar to 415 bar. The example first temperature sensor 210 can be a cryogenic silicon sensor, a silicon diode, a sheathed thermocouple, platinum resistance sensor, cryogenic temperature monitor, etc. In some examples, more than one first pressure sensor 208 and/or more than one first temperature sensor 210 are included in the onboard CcH2 tank 206. The example first pressure sensor 208 and the example first temperature sensor 210 are coupled to the CcH2 refueler 202 via a wired or wireless connection to transmit current pressure and temperature measurements of the CcH2 stored in the onboard CcH2 tank 206. Further details on how the example CcH2 refueler 202 uses the pressure and temperature measurements are described below.

The example system 200 illustrated in FIG. 2 includes the example transfer pump 214 to transmit LH2 from the example LH2 supply tank 102 to the example CcH2 refueler 202. The LH2 supply tank 102 can include LH2 at pressures slightly above atmospheric pressure (e.g., three bar, four bar, five bar, etc.). The example transfer pump 214 can increase the pressure of the LH2 (e.g., to four bar, five bar, six bar, etc.) to drive the LH2 downstream to the example cryogenic pump 216. The example transfer pump 214 as illustrated in FIG. 2 is a submerged cryogenic pump within the LH2 supply tank 102. In some examples, the transfer pump 214 is externally connected to the LH2 supply tank 102. The example transfer pump 214 can be an electronically and/or hydraulically driven cryogenic centrifugal pump. In some examples, the transfer pump 214 provides variable flow speeds of LH2 via a control panel on the LH2 supply tank 102. In some examples, the transfer pump 214 includes a gearbox that provides fixed or variable flow speeds of LH2 to the CcH2 refueler 202.

The example system 200 illustrated in FIG. 2 includes the example CcH2 refueler 202 to refuel the example onboard CcH2 tank 206 with CcH2 up to a target pressure while simultaneously maintaining a target temperature. The example CcH2 refueler 202 monitors a first temperature in the onboard CcH2 tank 206 and regulates a second temperature in the mixing tank 220 based on the first temperature. As shown in the figures and disclosed herein, the CcH2 refueler 202 sends sH2 to the mixing tank 220 to control the temperature of the CcH2 in the mixing tank 220 and, by extension, the temperature of the CcH2 in the onboard CcH2 tank 206.

The example system 200 illustrated in FIG. 2 includes the example cryogenic pump 216 to cryogenically compress the LH2 from the LH2 supply tank 102 and to drive CcH2 to the mixing tank 220 and the proportional valve 108. In some examples, the cryogenic pump 216 includes a suction adapter, a cold end piston, and the example pump motor 218. An intake line is connected to the transfer pump 214 to transport LH2 into the suction adapter of cryogenic pump 216. In the suction adapter, the LH2 temperature rises and a portion of the LH2 evaporates into GH2. The example cryogenic pump 216 further includes a return line leading from the suction adapter back to the LH2 supply tank 102 to recycle the GH2 and to ensure there is always a net positive suction head (NPSH) in the cryogenic pump 216. The NPSH facilitates pressure-driven flow of LH2 into the cryogenic pump 216 and allows the pump motor 218 to freely adjust the rate and amount of CcH2 leaving the cryogenic pump 216. The example cryogenic pump 216 includes the cold end piston to compress the LH2 from an input pressure (e.g., one bar to ten bar) to an output pressure (e.g., 100 bar to 350 bar) at cryogenic temperatures (e.g., 25 K, 30 K, 40 K, etc.). In some examples, one cold end piston is used in the cryogenic pump 216 to vary the output pressure (e.g., between 100 bar and 350 bar). In some examples, multiple cold end pistons are included in the cryogenic pump 216 and are used in series to vary the output pressure. As mentioned previously, by increasing the pressure of the LH2 at cryogenic temperatures, the LH2 converts/shifts/phases to a supercritical state, and the fuel leaving the cryogenic pump 216 can be referred to as CcH2. The example output CcH2 has a similar temperature (e.g., within 10 K, 20 K, 30 K, etc.) and a similar density (e.g., within 10 kg/m$^3$, 20 kg/m$^3$, 20 kg/m$^3$, 45 kg/m$^3$, etc.) as the input LH2.

The example system 200 illustrated in FIG. 2 includes the example motor 218 to accelerate the CcH2 out of the cryogenic pump 216 and to adjust the flowrate of the CcH2 through the system 200. As mentioned previously, the example flowmeter 110 can measure the volumetric flowrate and/or the mass flowrate of the CcH2 through the system 200. In some examples, the system 200 is to refuel the onboard CcH2 tank 206 in a timeframe threshold (e.g., 30 minutes, 45 minutes, one hour, etc.). When, for example, the onboard CcH2 tank 206 has a volume of 20 m$^3$, and the refuel process has a 30 minute threshold, then the pump motor 218 is to refuel the onboard CcH2 tank 206 at a desired volumetric flowrate of at least 0.011 cubic meters per second (m$^3$/s). In some examples, and discussed in further detail below, the CcH2 refueler controller 238 detects, via the flowmeter 110, when the CcH2 is flowing at a rate less than the desired flowrate. In response, the example CcH2 refueler controller 238 sends a signal to the pump motor 218 to increase the operational speed of the motor and, in turn, the flowrate of the CcH2.

The example system 200 illustrated in FIG. 2 includes the example mixing tank 220 to combine the CcH2 with varying quantities of the sH2 to adjust the temperature of the CcH2 in the onboard CcH2 tank 206. The example mixing tank 220 is a cryo-compressed tank with a same or a similar structural design as that of the onboard CcH2 tank 206 described previously. In some examples, the mixing tank 220 has a smaller internal volume than the onboard CcH2 tank 206 (e.g., 5 m³, 10 m³, 15 m³, etc.). The pressure inside the example mixing tank 220 adjusts according to the pressure output of the cryogenic pump 216 and is typically held at pressures slightly higher (e.g., one bar, two bar, etc.) than pressures within the onboard CcH2 tank 206. Thus, positive pressure drives the flow of CcH2 from the mixing tank 220 downstream to the onboard CcH2 tank 206.

The example system 200 illustrated in FIG. 2 includes the example second pressure sensor 222 and the example second temperature sensor 224 to send pressure and temperature measurements to the CcH2 refueler controller 238 (described in greater detail below) via electrical signals. For example, when the temperature sensor 224 sends a temperature reading to the CcH2 refueler controller 238 indicating that the temperature of the CcH2 in the mixing tank 220 is below a temperature threshold (e.g., 40 K), then the CcH2 refueler controller 238 increases the flow of sH2 into the mixing tank 220, thus increasing the temperature of the CcH2 in the mixing tank 220 and the onboard CcH2 tank 206. The example second pressure sensor 222 and the example second temperature sensor 224 can be of a same or similar type as the first pressure sensor 208 and the first temperature sensor 210 described previously.

The example system 200 illustrated in FIG. 2 includes the vaporizer 228 to warm the CcH2 to high-pressure sH2, which is mixed with the CcH2 in the mixing tank 220. The example vaporizer 228 can be a cryogenic vaporizer that uses fins to transfer heat from surrounding ambient air to the CcH2 flowing from the proportional valve 108. When the example vaporizer 228 increases the CcH2 temperature, the pressure of the sH2 remains substantially the same due to the high density of CcH2 (e.g., 62 kg/m³ or greater). The hydrogen leaving the example vaporizer 228 is in the same supercritical state as the upstream CcH2 but is no longer at cryogenic temperatures. Therefore, as mentioned previously, the hydrogen downstream of the vaporizer 228 and upstream of the mixing tank 220 is referred to as supercritical hydrogen (sH2). When the CcH2 heats up in the supercritical state (e.g., due to the vaporizer 228), the hydrogen gas molecules can expand within the same volume at the same pressure. Therefore, the sH2 downstream of the vaporizer 228 is the same pressure as the CcH2 upstream of the vaporizer 228 and in the mixing tank 220. Thus, the sH2 can flow freely to the mixing tank 220 and combine with the CcH2.

In some examples, after the refueling process is over, the temperature of the CcH2 downstream of the vaporizer 228 (e.g., in the mixing tank 220) can increase over time. During that time, pressures within the CcH2 refueler 202 and downstream of the cryogenic pump 216 can increase. Additionally or alternatively, during the refueling process, CcH2 can build up and/or solidify in the vaporizer 228 creating a blockage of flow (e.g., an ice block) and an increase of pressure upstream of the vaporizer 228. The example system 200 includes the example check valve 230 to prevent the pressure directly downstream of the cryogenic pump 216 from exceeding a pressure threshold. For example, if the pressure downstream of the vaporizer 228 is 50 bar prior to the refuel process, and if the check valve 230 is not included, then the cryogenic pump 220 has to provide a startup output pressure of at least 50 bar to drive the flow downstream. This can cause the flow to reverse upon startup, which can damage the cryogenic pump 216 or cause the CcH2 to flow upstream into the LH2 supply tank 102. The example check valve 230 allows the CcH2 fluid to flow in a first direction (e.g., from the proportional valve 108 to the vaporizer 228) but not in a second direction, opposite from the first direction. In some examples, the check valve 230 includes a body, an inlet port, and an outlet port and works automatically without the CcH2 refueler controller 238 operating the check valve 230 or causing a mechanism in the valve to actuate. The example check valve 230 can be designed with a reseal pressure specification that prevents a sufficiently significant back pressure from forming. For example, the check valve 230 is designed to close off, inhibit, and/or prevent the reversal of CcH2 flow when the pressure differential between the inlet and outlet ports satisfies a differential threshold (e.g., a pressure differential of one bar, 1.5 bar, 0.5 bar, etc.).

In some examples, the system 200 is refueling the aircraft 204 after a flight in which a portion (e.g., 95%, 90%, 80%, etc.) of the CcH2 fuel has been used. As previously mentioned, the example onboard CcH2 tank 206 is isobaric and may deliver the CcH2 fuel to the engines while maintaining a constant pressure. Therefore, the example onboard CcH2 tanks 206 may be above a preliminary pressure threshold prior to the refueling process. The preliminary pressure threshold (e.g., 1 bar, 5 bar, 10 bar, etc.) is the pressure that the onboard CcH2 tank 206 is to have before the refueling process can begin. So, in some example use cases, the refuel process includes defueling unused CcH2 from the example aircraft 204 to reduce the pressure in the onboard CcH2 tank 206 prior to refueling.

The example system 200 illustrated in FIG. 2 includes the example defueler valve 232 to release unused CcH2 from the onboard CcH2 tank 206 prior to refueling the aircraft 204. The example defueler valve 232 may open in response to a command from the pressure loop circuitry 246 and/or the position loop circuitry 250 based on the onboard pressure not satisfying the preliminary pressure threshold. For example, if the preliminary pressure threshold is 10 bar, and the onboard pressure prior to refueling is 50 bar, then the defueler valve 232 opens to facilitate flow to a lower downstream pressure area (e.g., the mixing tank 220, the hydrogen containers 236, open atmosphere, etc.). In some examples, the defueler valve 232 is a proportional valve similar to the proportional valve 108 of FIGS. 1 and 2 that allows for variable outlet flowrates given fluctuating inlet pressures, temperatures, densities, etc. In some examples, the defueler valve 232 is a cryogenic valve similar to the refueler valve 112 of FIGS. 1 and 2 that can switch from fully open to fully closed some time (e.g., two times, five times, ten times, etc.) faster than the example proportional valve 108.

The example system 200 illustrated in FIG. 2 includes the example split valve 234 to direct or divert CcH2 from the onboard CcH2 tank 206 to the mixing tank 220, the hydrogen containers 236, and/or to a secondary destination (e.g., open atmosphere, another hydrogen storage tank, the LH2 supply tank 102, etc.). In some examples, the split valve 234 directs or diverts the CcH2 to the secondary destination when the mixing tank 220 and the hydrogen containers 236 are at a higher pressure than the onboard CcH2 tank 206 and when the pressure of the onboard CcH2 tank 206 is higher than the preliminary pressure threshold.

In some examples, the CcH2 refueler 202 is to refuel the example aircraft 204 after landing and/or defueling, at which point the onboard CcH2 tank 206 may contain a small portion of CcH2 (e.g., 10% capacity, 15% capacity, etc.) at high pressures (e.g., 100 bar to 350 bar) and high temperatures (e.g., 350 K, 250 K, etc.). Prior to refueling, the example CcH2 refueler controller 238 determines whether the onboard pressure satisfies the preliminary pressure threshold (e.g., 5 bar, 20 bar, 30 bar, etc.). When the example onboard pressure is greater than the preliminary pressure threshold, then the CcH2 refueler 202 causes the defueler valve 232 to open to a desired flowrate. In some examples, when the pressure of the onboard CcH2 tank 206 does not satisfy the pressure threshold and when the pressure of the mixing tank 220 is less than the pressure of the onboard CcH2 tank 206, then the split valve 234 directs/diverts the CcH2 to the mixing tank 220. In some examples, when the pressure of the onboard CcH2 tank 206 does not satisfy the pressure threshold and when the pressure of the mixing tank 220 is greater than or equal to the pressure of the onboard CcH2 tank 206, then the split valve 234 directs/diverts the CcH2 from the onboard CcH2 tank 206 to the hydrogen containers 236 and/or another secondary destination (e.g., atmosphere). The example hydrogen containers 236 illustrated in FIG. 2 can be at low pressures (e.g., two bar, five bar, etc.) or atmospheric pressures (e.g., 14.7 psi, one bar, etc.) prior to defueling/refueling the example aircraft 204. In some examples, the hydrogen containers 236 are at high enough pressures (e.g., 20 bar, 50 bar, etc.) that a compressor is included to drive the onboard CcH2 into the hydrogen containers 236. When included in the example system 200, the compressor is located upstream of the hydrogen containers 236 and downstream of the split valve 234.

The example system 200 illustrated in FIG. 2 includes the CcH2 refueler controller 238 to automatically control and to facilitate operation of the CcH2 refueler 202. In some examples, the CcH2 refueler controller 238 is a closed-loop control system including the processor circuitry 240 and the memory 242. The example processor circuitry 240 includes the example flowrate loop circuitry 244, the example pressure loop circuitry 246, the example temperature loop circuitry 248, and the example position loop circuitry 250. The example processor circuitry 240 can instantiate (e.g., create an instance of, bring into being for any length of time, materialize, implement, etc.) the CcH2 refueler controller 238 of FIG. 2. In some examples, the processor circuitry 240 is a central processing unit executing instructions. Additionally or alternatively, the processor circuitry 240 can be an application-specific integrated circuitry (ASIC) or a field-programmable gate array (FPGA) structured to perform operations corresponding to the instructions. It should be understood that some or all of the processor circuitry 240 of FIG. 2 can, thus, be instantiated at the same or different times. Some or all of the processor circuitry 240 can be instantiated, for example, in one or more threads executing concurrently on hardware and/or in series on hardware. Moreover, in some examples, one or more virtual machines and/or containers executing on a microprocessor can implement some or all of the processor circuitry 240 of FIG. 2. The example flowrate loop circuitry 244, the example pressure loop circuitry 246, the temperature loop circuitry 248, and the position loop circuitry 250 illustrated in FIG. 2 are integrated on the processor circuitry 240. In some examples, the flowrate loop circuitry 244, the pressure loop circuitry 246, the temperature loop circuitry 248, and/or the position loop circuitry 250 are integrated on separate circuitry (e.g., processor circuitry, FPGA, ASIC, microprocessor, etc.).

The example flowrate loop circuitry 244 illustrated in FIG. 2 causes an adjustment of the flowrate of CcH2 through the system 200 based on an actual flowrate that the example flowmeter 110 measures and a target flowrate that the flowrate loop circuitry 244 determines. In some examples, the CcH2 refueler 202 includes an output device (e.g., a display screen, monitor, headset, etc.) to communicate information (e.g., system status, actual and target onboard pressure, actual and target onboard temperatures, etc.) to a user of the CcH2 refueler 202. In some examples, the CcH2 refueler 202 includes an input device (e.g., a knob, a mouse, a keyboard, a touchscreen, etc.) to receive inputs from the user. In response to machine-readable instructions and/or user input(s) indicating the target flowrate, an example program or application stored in the memory 242 can cause the flowrate loop circuitry 244 to command (e.g., via electrical signals) the pump motor 218 to adjust the operational speed of the pump motor 218. In some examples, the user input indicates a target timespan in which the refueling process is to be conducted. The example flowrate loop circuitry 244 can calculate the target flowrate based on the target timespan and the volume of the example onboard CcH2 tank 206. For example, if the onboard CcH2 tank is 15 m$^3$, and the target timespan is 20 minutes, then the flowrate loop circuitry 244 determines the target flowrate to be 0.0125 m$^3$/s.

In response to detecting the actual flowrate and determining the target flowrate, the example flowrate loop circuitry 244 can send a command to the pump motor 218 to increase or decrease the speed of the motor based on the actual and target flowrates. In some examples, the flowrate loop circuitry 244 calculates a flowrate error between the actual and target flowrates and continues to send the command to the pump motor 218 until the flowrate error satisfies a flowrate error threshold (e.g., 0.001 m$^3$/s, 0.005 m$^3$/s, etc.). For example, if the actual flowrate is 0.01 m$^3$/s, and the target flowrate is 0.015 m$^3$/s, then the flowrate loop circuitry 244 instructs the pump motor 218 to increase the operational speed of the pump motor 218 until the flowrate reaches 0.015 m$^3$/s. Additionally or alternatively, the flowrate loop circuitry 244 can continue to send the instructions to the pump motor 218 until the flowrate error satisfies the flowrate error threshold. For example, until the actual flowrate reaches 0.014 m$^3$/s or 0.016 m$^3$/s, given a flowrate error threshold of 0.001 m$^3$/s. In some examples, the flowrate loop circuitry 244 continually receives actual flowrate measurements, determines and/or receives target flowrate, calculates the flowrate error, and sends commands to the pump motor 218 until the flowrate error is sufficiently close to zero.

The example pressure loop circuitry 246 illustrated in FIG. 2 causes an adjustment of the pressure of CcH2 in the mixing tank 220 and the onboard CcH2 tank 206 based on an actual pressure that the first and/or second pressure sensors 208, 222 measure(s) and the target pressure that the pressure loop circuitry 246 determines. In response to machine-readable instructions and/or user input(s) indicating the target pressure, the example program and/or application stored in the memory 242 can cause the pressure loop circuitry 246 to command the cryogenic pump 216 to adjust the output pressure of the cryogenic pump 216. For example, the machine-readable instructions indicate a target onboard pressure of 100 bar to the pressure loop circuitry 246, and the first pressure sensor 208 indicates an actual onboard pressure measurement of 20 bar to the pressure loop circuitry 246.

In response to receiving the target pressure (e.g., 100 bar) and the actual pressure (e.g., 20 bar), the example pressure loop circuitry 246 can determine an intermediate target pressure (e.g., 22 bar) that is sufficiently higher than the actual pressure but not so high as to cause any catastrophic pressure increases to the system 200 (e.g., a pressure increase that causes a leak, rupture, deformation, etc.). In response to determining the intermediate target pressure, the example pressure loop circuitry 246 can command the cryogenic pump 216 to output a pressure of 22 bar to introduce positive pressure head to the system 200. In some examples, the cryogenic pump 216 adjusts actuation of the cold end piston to compress the LH2 into a smaller displacement volume in a cylinder of the cryogenic pump 216 to increase the output pressure (e.g., displacement volume of 200 cubic centimeters (cm$^3$) for a 20 bar output versus displacement volume of 195 cm$^3$ for a 22 bar output). In some examples, the pressure loop circuitry 246 calculates a pressure error between the actual and intermediate target pressures and continues to send the command to the cryogenic pump 216 until the pressure error satisfies a pressure error threshold (e.g., 0.25 bar, 0.5 bar, 1 bar, etc.). For example, when the actual pressure of the mixing tank 220 is 20 bar, and the intermediate target pressure is 22 bar, then the pressure loop circuitry 246 instructs the cryogenic pump 216 to increase the output pressure of the CcH2 until the actual pressure of the mixing tank 220 is 22 bar. Additionally or alternatively, the pressure loop circuitry 246 can continue to send the instructions to the cryogenic pump 216 until the pressure error satisfies the pressure error threshold. For example, until the actual pressure reaches 21.75 bar or 22.25 bar, given a pressure error threshold of 0.25 bar. In some examples, the pressure loop circuitry 246 causes the system to end the refueling process and to shut off the example refueler valve 112 in response to the actual pressure of the onboard CcH2 tank 206 reaching the target pressure and/or increasing to a value sufficiently close to the target pressure (e.g., 99 bar, 99.5 bar, 101 bar, etc.). In some examples, the pressure loop circuitry 246 continually receives actual pressure measurements, determines and/or receives target pressures and/or intermediate target pressures, calculates the pressure error, and sends commands to the cryogenic pump 216 until the pressure error is sufficiently close to zero.

The example temperature loop circuitry 248 illustrated in FIG. 2 causes an adjustment of the temperature of CcH2 in the mixing tank 220 and the onboard CcH2 tank 206 based on an actual temperature that the first and/or second temperature sensors 210, 224 measure(s) and a target temperature that the temperature loop circuitry 248 determines. In response to machine-readable instructions and/or user input(s) indicating the target temperature, the example program and/or application stored in the memory 242 can cause the temperature loop circuitry 248 to command the proportional valve 108 to adjust the flowrate of the CcH2 through the vaporizer 228. For example, the user input(s) indicate(s) a target onboard temperature of 40 K to the temperature loop circuitry 248, and the first temperature sensor 210 indicates an actual onboard temperature measurement of 35 K to the temperature loop circuitry 248. In response to detecting the actual temperature of 35 K and determining and/or receiving the target temperature of 40 K, the example temperature loop circuitry 248 sends a command to the proportional valve 108 to increase the flowrate of the CcH2 into the vaporizer 228 until the actual temperature reaches 40 K.

In some examples, the temperature loop circuitry 248 calculates a temperature error between the actual and target temperature and continues to send the command to the proportional valve 108 until the temperature error satisfies a temperature error threshold (e.g., 0.1 K, 0.2 K, 0.5 K, etc.). In some examples, the temperature loop circuitry 248 continues to send the instructions to the proportional valve 108 until the temperature error satisfies the temperature error threshold. For example, until the actual temperature reaches 39.9 K or 40.1 K, given a temperature error threshold of 0.1 K. In some examples, the temperature loop circuitry 248 continually receives actual temperature measurements, determines and/or receives target temperature(s), calculates the temperature error, and sends commands to the proportional valve 108 until the temperature error is sufficiently close to zero.

The example position loop circuitry 250 illustrated in FIG. 2 causes actuation of the cryogenic pump 216, the pump motor 218, the proportional valve 108, the refueler valve 112, the defueler valve 232, and/or the split valve 234 based on command(s) from the flowrate loop circuitry 244, the pressure loop circuitry 246, and/or the temperature loop circuitry 248. In response to the command(s), the position loop circuitry 250 detects an actual position (e.g., valve piston displacement) or operational state (e.g., motor speed) and determines a target position or operational state. For example, the temperature loop circuitry 248 instructs the proportional valve 108 to increase the CcH2 flow through the vaporizer 228. In response, the position loop circuitry 250 detects the actual position (e.g., 1 cm displacement from a calibrated zero position) of a valve member (e.g., piston, spool, plug, etc.) within the proportional valve 108 and determine the target position (e.g., 5 cm displacement) of the valve member based on the actual position, the actual temperature, and the target temperature. The example position loop circuitry 250 commands the proportional valve 108 to actuate the valve member until the actual position reaches 5 cm displacement.

In some examples, the position loop circuitry 250 calculates a position error between the actual and target positions and continues to send the command to the proportional valve 108 to actuate the valve member until the position error satisfies a position error threshold (e.g., 0.01 cm, 0.05 cm, 0.1 cm, etc.). In some examples, the position loop circuitry 250 continues to send the instructions to the proportional valve 108 until the position error satisfies the position error threshold. For example, until the actual position reaches 4.95 cm or 5.05 cm, given the position error threshold of 0.05 cm. In some examples, the position loop circuitry 250 continually and/or simultaneously receives actual position(s), determines and/or receives target position(s), calculates the position error(s), and sends commands to the cryogenic pump 216, the pump motor 218, the proportional valve 108, the refueler valve 112, the defueler valve 232, and/or the split valve 234 until the position error is sufficiently close to zero.

Figure 3:
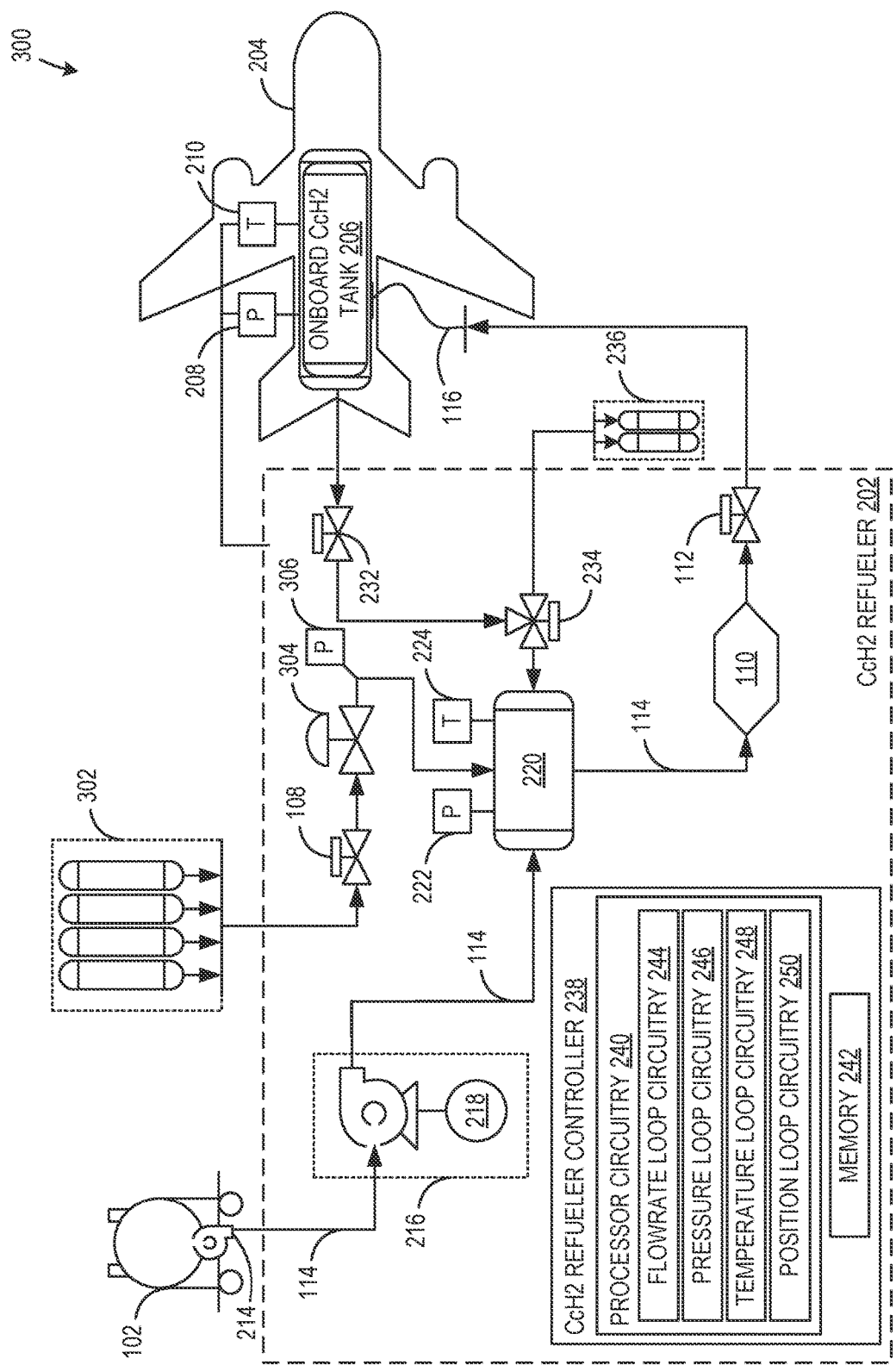
FIG. 3 illustrates a second example CcH2 refueling system in accordance with the teachings of this disclosure.

FIG. 3 illustrates a second example CcH2 refueling system 300 ("system 300") to supply CcH2 fuel to the example aircraft 204 up to the target pressure of the onboard CcH2 tank 206 while achieving a controlled and/or consistent temperature. The example system 300 includes the example LH2 supply tank 102, the example first proportional valve 108, the example flowmeter 110, the example refueler valve 112, the example VJ flowlines 114, and the example flexible VJ flowline(s) 116 as illustrated in FIGS. 1 and 2. The example system 300 further includes the example CcH2 refueler 202, the example hydrogen aircraft 204, the example onboard CcH2 tank 206, the example first pressure sensor 208, the example first temperature sensor 210, the example transfer pump 214, the example cryogenic pump 216, the example pump motor 218, the example mixing tank 220, the example second pressure sensor 222, the example second temperature sensor 224, the example defueler valve 232, the example split valve 234, the example hydrogen containers 236, the example CcH2 refueler controller 238, the example processor circuitry 240, the example memory 242, the example flowrate loop circuitry 244, the example pressure loop circuitry 246, the example temperature loop circuitry 248, and the example position loop circuitry 250 as illustrated in FIG. 2. As illustrated in FIG. 3, the example system 300 includes example hydrogen storage tanks 302, an example regulator valve 304, and an example third pressure sensor 306. The example system 300 illustrated in FIG. 3 adjusts flow of sH2 into the mixing tank 220 to control the temperature of the CcH2 in the mixing tank 220 and the onboard CcH2 tank 206. Rather than the vaporizer 228 of system 200 in FIG. 2, the system 300 uses highly compressed (e.g., 20 bar or greater) sH2 in the example hydrogen storage tanks 302 as the sH2 source.

The example system 300 illustrated in FIG. 3 includes the hydrogen storage tanks 302 to supply the mixing tank 220 with sH2 and to provide an adjustment to the temperature of the CcH2 in the mixing tank 220 and in the onboard CcH2 tank 206. The example hydrogen storage tanks 302 can be of a same or a similar design and/or structure as the example hydrogen containers 236. However, the example hydrogen storage tanks 302 are preloaded with sH2 compressed up to a pressure (e.g., 200 bar, 300 bar, 500 bar, etc.) at non-cryogenic temperatures (e.g., 125 K, 150 K, 200 K, etc.). In some examples, the hydrogen storage tanks 302 illustrated in FIG. 3 contain sH2 at pressures greater than the output pressures of the cryogenic pump 216 and/or greater than the target onboard pressures (e.g., 100 bar to 350 bar). In some examples, the hydrogen storage tanks 302 contain sH2 at pressures less than the output pressures of the cryogenic pump 216 and/or less than the target onboard pressures. In such examples, the example system 300 includes a pump and/or compressor downstream of the proportional valve 108 and upstream of the mixing tank 220. Although four hydrogen storage tanks 302 are illustrated in FIG. 3, one or more hydrogen storage tanks 302 may be included in the example system 300.

The example system 300 illustrated in FIG. 3 includes the regulator valve 304 to set the pressure of the sH2 leaving the proportional valve 108 equal to or sufficiently close to the pressure of the mixing tank 220. In some examples, the regulator valve 304 is pressure reducing regulator that reduces an input pressure (e.g., 100 bar) to a lower output pressure (e.g., 20 bar) despite fluctuations in the input pressure (e.g., pressure reductions from 100 bar to 90 bar). In other words, as the proportional valve 108 releases sH2 from the hydrogen storage tanks 302, the output pressure of the proportional valve 108 decreases, but the regulator valve 304 is still able to provide a consistent output pressure to the mixing tank 220.

Since the hydrogen storage tanks 302 do not provide sH2 to the mixing tank 220 at a same or similar pressure as the internal pressure of the mixing tank 220 (like the example vaporizer 228 of FIG. 2), the example pressure loop circuitry 246 and the example position loop circuitry 250 control the example regulator valve 304. For example, the temperature loop circuitry 248 determines that the actual onboard temperature is less than the target temperature and causes the proportional valve 108 to increase the flowrate of sH2 to the mixing tank 220. In response to the command from the temperature loop circuitry 248, the example pressure loop circuitry 246 can read the actual pressure in the mixing tank 220 from the second pressure sensor 222 and command the regulator valve 304 to set an output pressure to match or come sufficiently close to (e.g., within 0.1 bar, 0.2 bar, 0.5 bar, etc. of) the actual pressure of the mixing tank 220.

The example system 300 illustrated in FIG. 3 includes the example third pressure sensor 306 to detect the output pressure of the regulator valve 304. In some examples, the pressure loop circuitry 246 obtains the actual pressure of the mixing tank 220 from the second pressure sensor 222 and the output pressure of the regulator valve 304 from the third pressure sensor 306. The example pressure loop circuitry 246 can command the regulator valve 304 to adjust the output pressure to match the actual pressure of the mixing tank 220. Additionally or alternatively, the pressure loop circuitry 246 can calculate a regulator error as a difference between the actual pressure of the mixing tank 220 and the output pressure of the regulator valve 304 and can continue to instruct the regulator valve 304 to adjust the output pressure until the regulator error is sufficiently close to zero (e.g., 0.05 bar, 0.1 bar, 0.2 bar, etc.).

In some examples, the position loop circuitry 250 detects an actual position of a valve member in the regulator valve 304 that facilitates the output pressure. The example position loop circuitry 250 can also determine a target position of the valve member based on the output pressure of the regulator valve 304 and the actual pressure of the mixing tank 220. In some examples, the position loop circuitry 250 causes the regulator valve 304 to actuate the valve member until the actual position matches the target position, until a positional error is sufficiently close to zero, or until the pressure loop circuitry 246 determines that the pressure error is sufficiently close to zero, as described previously.

Figure 4:
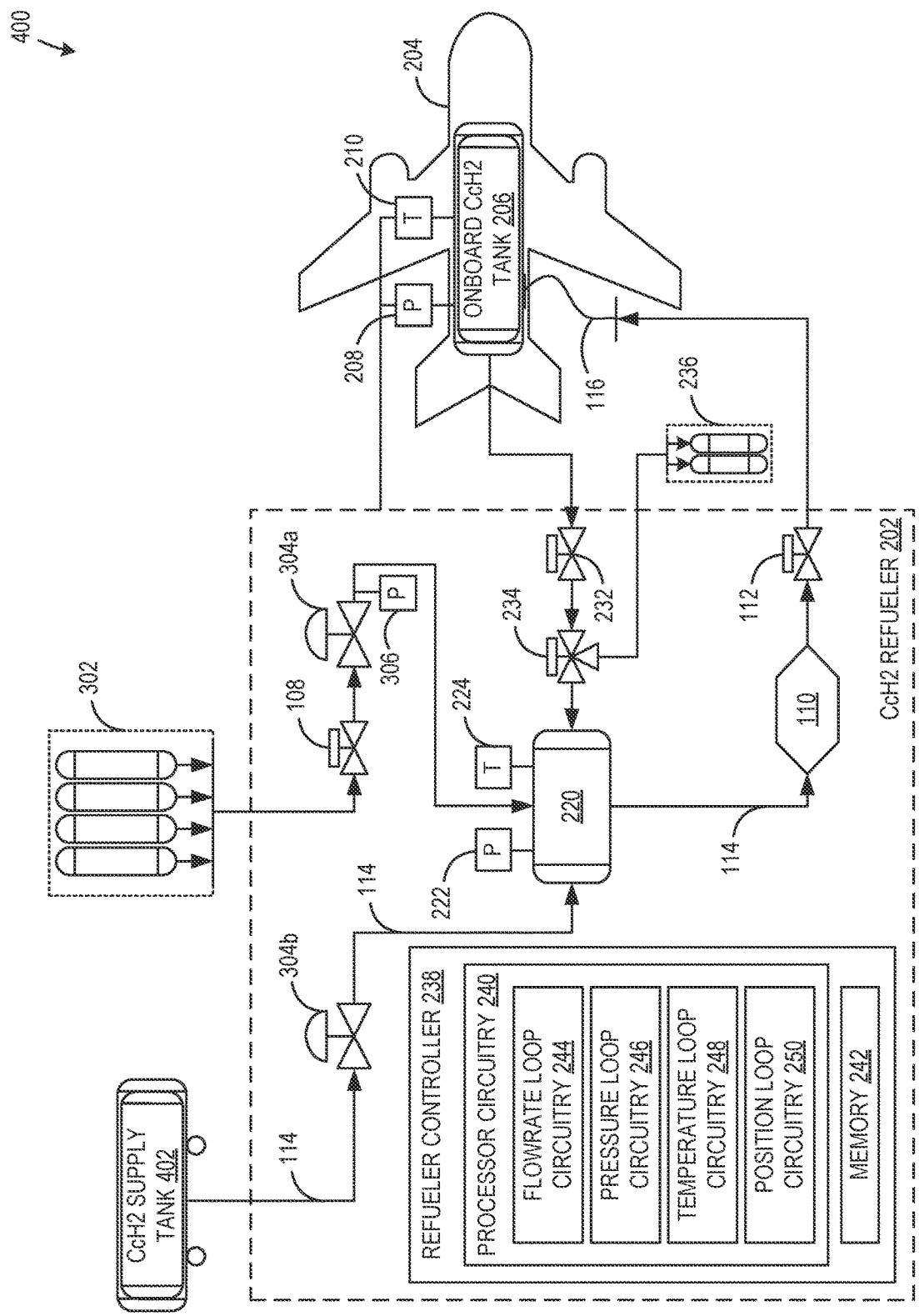
FIG. 4 illustrates a third example CcH2 refueling system in accordance with the teachings of this disclosure.

FIG. 4 illustrates a third example CcH2 refueling system 400 ("system 400") to supply CcH2 fuel to the example hydrogen aircraft 204 up to the target pressure of the example onboard CcH2 tank 206 at a controlled and/or consistent temperature. The example system 400 includes the example LH2 supply tank 102, the example proportional valve 108, the example flowmeter 110, the example refueler valve 112, the example VJ flowlines 114, and the example flexible VJ flowline(s) 116 as illustrated in FIGS. 1-3. The example system 400 further includes the example CcH2 refueler 202, the example hydrogen aircraft 204, the example onboard CcH2 tank 206, the example first pressure sensor 208, the example first temperature sensor 210, the example transfer pump 214, the example mixing tank 220, the example second pressure sensor 222, the example second temperature sensor 224, the example split valve 234, the example defueler valve 232, the example hydrogen containers 236, the example CcH2 refueler controller 238, the example processor circuitry 240, the example memory 242, the example flowrate loop circuitry 244, the example pressure loop circuitry 246, the example temperature loop circuitry 248, the example position loop circuitry 250, the example hydrogen storage tanks 302, and the example third pressure sensor 306 as illustrated in FIGS. 2 and/or 3. As illustrated in FIG. 4, the example system 400 includes an example CcH2 supply tanks 402, a first regulator valve 304a, and a second regulator valve 304b. For the figures disclosed herein, the example first regulator valve 304a and the example second regulator valve 304b are of the same type and functionality as the example regulator valve 304 illustrated in FIG. 3. The example systems 200 and 300 illustrated in FIGS. 2 and 3 include the LH2 supply tank 102, the transfer pump 214, and the cryogenic pump 216 to serve as a source of CcH2. In contrast, the example system 400 includes the CcH2 supply tank 402 and the second regulator valve 304b to serve as the CcH2 source.

The example system 400 illustrated in FIG. 4 includes the example CcH2 supply tank 402 to provide CcH2 fuel to the system 400 for the refueling process. In some examples, the CcH2 supply tank 402 is of a same or a similar design, structure, and/or functionality as the onboard CcH2 tank 206. Similar to the example LH2 supply tank 102 of FIGS. 1-3, the example CcH2 supply tank 402 can be a mobile tank capable of being transported to the example CcH2 refueler 202 and the example aircraft 204 via a truck, trailer, bus, etc.

The example CcH2 supply tank 402 allows for reduced complication of the system 400 with respect to the example systems 200 and/or 300 due to the elimination of the cryogenic pump 216 and the pump motor 218. However, the example CcH2 supply tank 402 may not be available at the time of the refueling process, for example when the CcH2 supply tank 402 is empty or when the cost to provide the CcH2 supply tank 402 to the CcH2 refueler 202 is too great for a given refueling budget.

The example system 400 illustrated in FIG. 4 includes the example second pressure regulator 304b to adjust an output pressure of the CcH2 supply tank 402. In some examples, the second pressure regulator 304b adjusts the output pressure based on the actual pressure of the mixing tank 220 and/or the onboard CcH2 tank 206 and based on the target pressure and/or the intermediate target pressure, as mentioned previously. For example, the pressure loop circuitry 246 determines an intermediate target pressure of 22 bar, and the second pressure sensor 222 detects an actual pressure of 20 bar. Thus, the example pressure loop circuitry 246 can command the second regulator valve 304b to increase the output pressure until the actual pressure reached 22 bar or until a pressure error (e.g., that the pressure loop circuitry 246 calculates) is sufficiently close to zero (e.g., 0.01 bar, 0.05 bar, 0.1 bar, etc.), as described previously.

Figure 5:
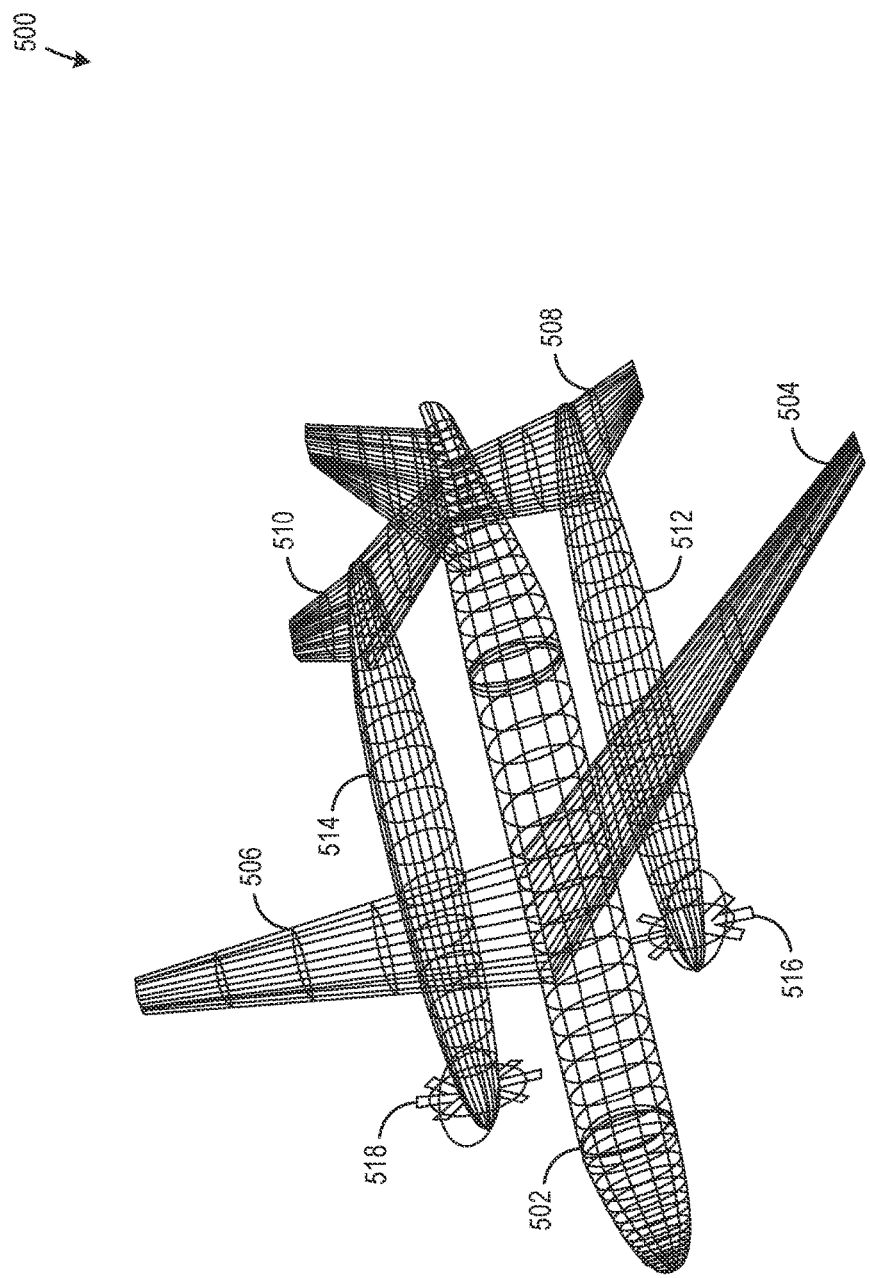
FIG. 5 illustrates an example hydrogen aircraft with example onboard CcH2 tanks.

FIG. 5 illustrates an example hydrogen aircraft 500 to be refueled with CcH2 fuel. The example hydrogen aircraft 500 includes a fuselage 502, a first (e.g., left) wing 504, a second (e.g., right) wing 506, a first horizontal stabilizer 508, a second horizontal stabilizer 510, a first CcH2 tank 512, a second CcH2 tank 514, a first engine 516, and a second engine 518. The example hydrogen aircraft 500 can be a military aircraft or a commercial aircraft that stores CcH2 onboard as a fuel source for the first engine 516, the second engine 518, and/or additional or alternative engine(s) not shown in FIG. 5. The example systems 200, 300, and/or 400 of FIGS. 2-4 can be used to refuel the first and/or second CcH2 tanks 512, 514 of the hydrogen aircraft 500. In some examples, the first CcH2 tank 512 and/or the second CcH2 tank 514 are removable and replaceable and are refueled while attached and/or detached from the hydrogen aircraft 500.

The example hydrogen aircraft 500 illustrated in FIG. 5 includes the example fuselage 502 to hold cargo, passengers, landing gear, etc. while in flight. The example fuselage 502 can be designed with a truss framework, a monocoque construction, and/or a semi-monocoque construction to provide structural integrity to the aircraft during takeoff, landing, or in flight. In some examples, the fuselage 502 also includes a wing box to attach the first and second wings 504, 506 to the hydrogen aircraft 500.

The example hydrogen aircraft 500 illustrated in FIG. 5 includes the example first and second wings 504, 506 to provide lift to the hydrogen aircraft 500. The example first and second wings 504, 506 illustrated in FIG. 5 are swept back from root to tip. In some examples, the first and second wings 504, 506 are swept forward, straight sideways, or delta wings depending on the function, intended range, intended endurance, and/or intended velocity of the hydrogen aircraft 500. In some examples, the first and second wings 504, 506 include latching mechanisms that secure the example first and second CcH2 tanks 512, 514 to the hydrogen aircraft 500. For example, the first and second wings 504, 506 include male or female component(s) of latching mechanism(s) (e.g., a two-stage rotary latch, a magnetic latch, a cam latch, a cam lock, etc.).

The example hydrogen aircraft 500 illustrated in FIG. 5 includes the example first and second horizontal stabilizers 508, 510 to provide longitudinal stability and control of the hydrogen aircraft 500. The example first horizontal stabilizer 508 is a first set of tail wings with one or more airfoil profiles in a swept back configuration. The example second horizontal stabilizer 510 is a second set of tail wings with the same airfoil profile(s) and swept back to the same degree. In some examples, the hydrogen aircraft 500 includes one horizontal stabilizer with a single set of tail wings instead of two horizontal stabilizers as shown in FIG. 5. In some examples, the first and second horizontal stabilizers 508, 510 include latching mechanisms that secure the example first and second CcH2 tanks 512, 514 to the hydrogen aircraft 500. For example, the first and second horizontal stabilizers 508, 510 include male or female component(s) of the latching mechanism(s) previously mentioned.

The example hydrogen aircraft 500 illustrated in FIG. 5 includes the example first and second CcH2 tanks 512, 514 to store the CcH2 fuel onboard the hydrogen aircraft 500. In some examples, the first and/or second CcH2 tanks 512, 514 are drop tanks capable of being secured to and removed from the first and second wings 504, 506 and the first and second horizontal stabilizers 508, 510 via male and/or female components of the latching mechanism(s). In some examples, the first and/or second CcH2 tanks 512, 514 are removed when the CcH2 fuel capacity is at a low enough capacity (e.g., 5%, 7%, 10% capacity, etc.) and replaced with replenished CcH2 tanks of the same type and/or design as the first and second CcH2 tanks 512, 514. In some examples, the first and second CcH2 tanks 512, 514 are not removable except via disassembly that may compromise the structural integrity, aerodynamic capability, controllability, weight distribution, performance, lifespan, etc., of the hydrogen aircraft 500.

The example hydrogen aircraft 500 illustrated in FIG. 5 includes the example first and second engines 516, 518 to provide thrust to the hydrogen aircraft 500. The example first and second engines 516, 518 illustrated in FIG. 5 are included in the structural framework of the example first and second onboard CcH2 tanks 512, 514. In some examples, the example first and second engines 516, 518 are separate from the first and second onboard CcH2 tanks 512, 514, mounted on the first and second wings 504, 506, and are not removable from the hydrogen aircraft 500 except via disassembly. The example first and second engines 516, 518 illustrated in FIG. 5 are propeller engines with fixed pitch, constant speed, or ground adjustable propellers. In some examples the first and second engines 516, 518 are turboprop, turbofan, or turbojet engines attached to the first and second onboard CcH2 tanks 512, 514 or the first and second wings 504, 506.

Figure 6:
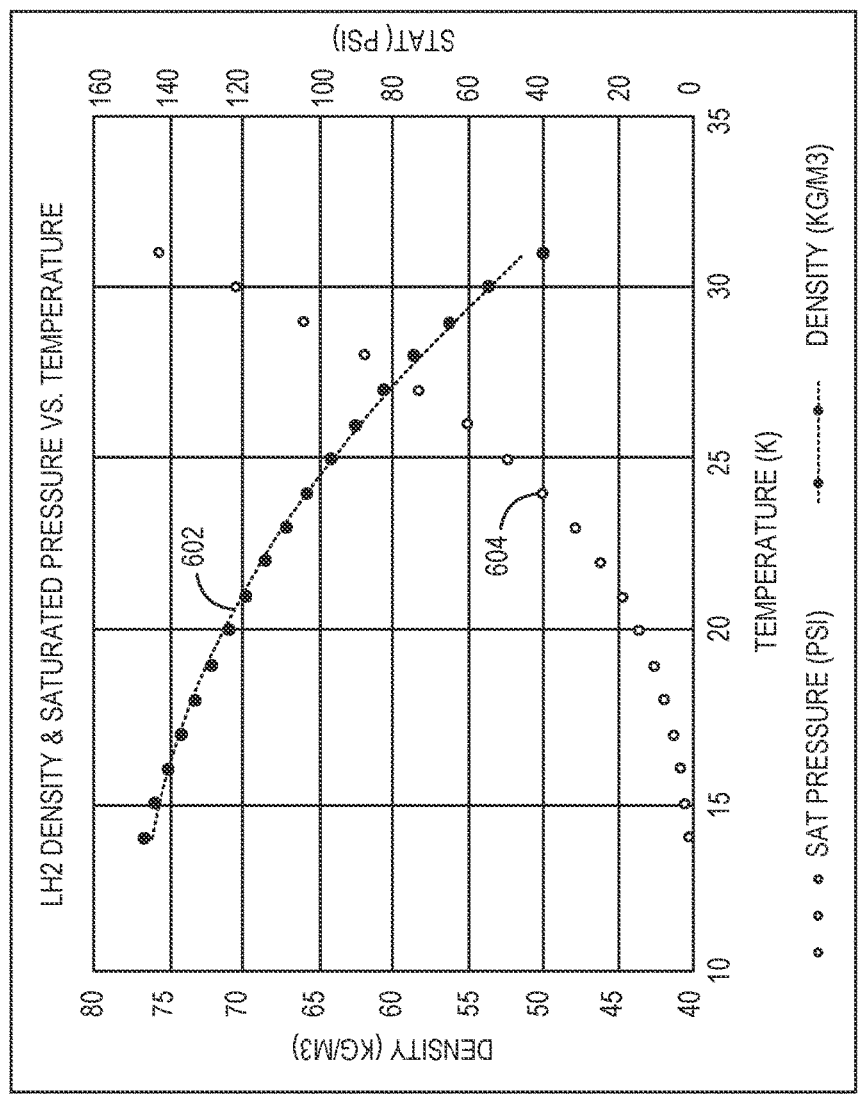
FIG. 6 illustrates saturated pressure versus temperature and density versus temperature of LH2.

FIG. 6 is a chart 600 illustrating thermodynamic properties of LH2. The example chart 600 includes a first thermodynamic relationship 602 of LH2 to represent density (kg/m$^3$) as a function of temperature (K) and a second thermodynamic relationship 604 of LH2 to represent saturated pressure (pounds per square inch (psi)) as a function of temperature (K). The thermodynamic relationships 602, 604 of LH2 shown in FIG. 6 can be used to determine the mass of LH2 refueled to the onboard LH2 tank 106 and a target temperature and saturated pressure of the onboard LH2 tank 106 of FIG. 1. The example FIG. 6 is included herein to exemplify the temperature and saturated pressure ranges of LH2 in contrast to those of CcH2, described below.

Figure 7:
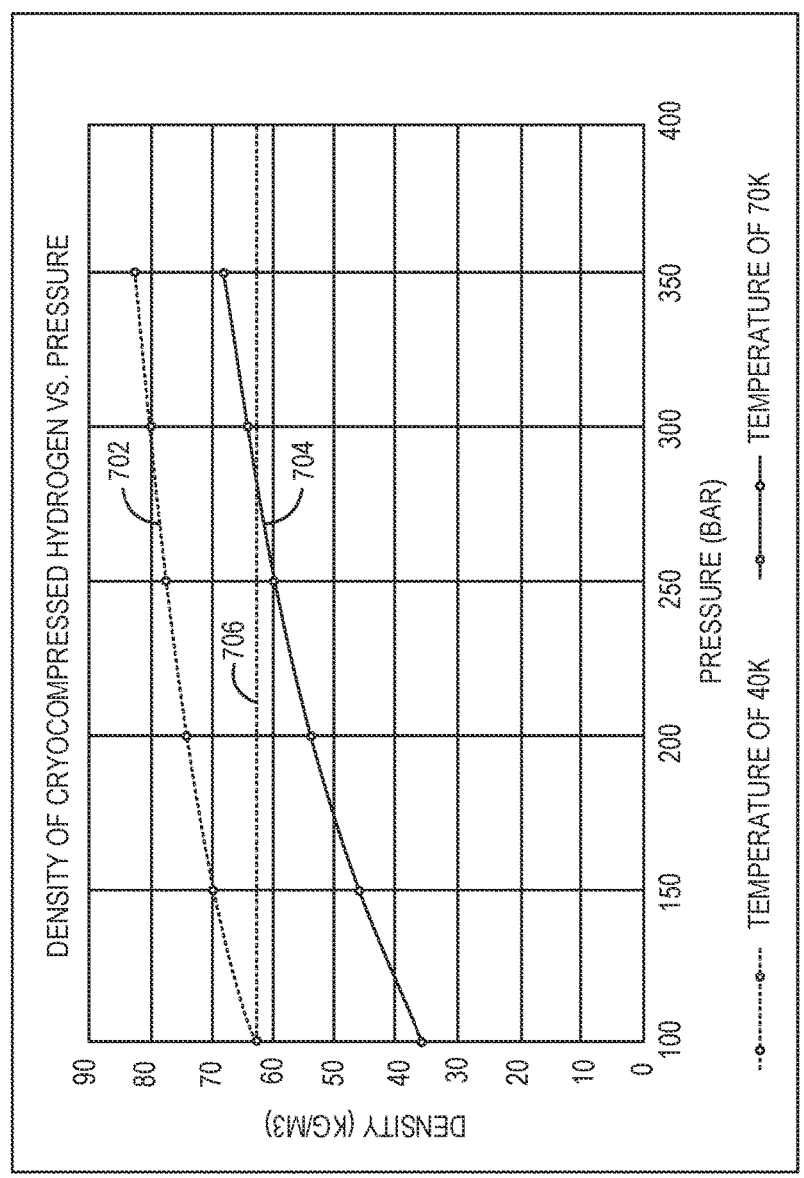
FIG. 7 illustrates density versus pressure of CcH2 at two different temperatures.

FIG. 7 is a chart 700 illustrating thermodynamic properties of CcH2. The example chart 700 includes a first thermodynamic relationship 702 of CcH2 to represent density (kg/m$^3$) as a function of pressure (bar) at a temperature of 40 K and a second thermodynamic relationship 704 of CcH2 to represent density (kg/m$^3$) as a function of pressure (bar) at a temperature of 70 K. The example chart 700 also includes a reference line 706 to demonstrate the effect of temperature has on the density of CcH2. For example, CcH2 at a temperature of 70 K and a pressure of 280 bar has a density of 62 kg/m$^3$, and CcH2 at 40 K and a pressure of 100 bar also has a density of 62 kg/m$^3$. When the CcH2 fuel is refueled to the aircraft 204 at 40 K, the onboard CcH2 tank 206 has an internal volume of 20 m$^3$, and the aircraft 204 relies on 1200 kg of CcH2 fuel for an intended flight, then the example onboard CcH2 tank 206 can be designed with an internal pressure limit of 100 bar. When the CcH2 fuel is refueled to the aircraft 204 at 70 K with the same onboard CcH2 tank 206 and the same amount of CcH2 fuel, then the example CcH2 tank 206 can be designed with an internal pressure limit of 280 bar. In the latter case, the example onboard CcH2 tank 206 includes more material (e.g., aluminum, steel, carbon fiber, etc.) to structurally facilitate containment of the potentially higher pressures. By utilizing an onboard CcH2 tank 206 with a pressure limit of 100 bar instead of 280 bar, the example aircraft 204 saves a significant amount of weight that may be allocated to other resources (e.g., carrying more cargo, passengers, better performance, longer range, etc.). Thus, the example CcH2 refueling systems 200, 300, and/or 400 of FIGS. 2-4 are utilized to allow the example hydrogen aircraft 204 of FIG. 2, the example hydrogen aircraft 500 of FIG. 5, and/or another hydrogen vehicle (e.g., car, truck, bus, ship, etc.) to refuel the CcH2 at a precise temperature based on the pressure limits (e.g., 100 bar) of an onboard CcH2 tank (e.g., onboard CcH2 tank 206, the first CcH2 tank 512, the second CcH2 tank 514, etc.).

Figure 8:
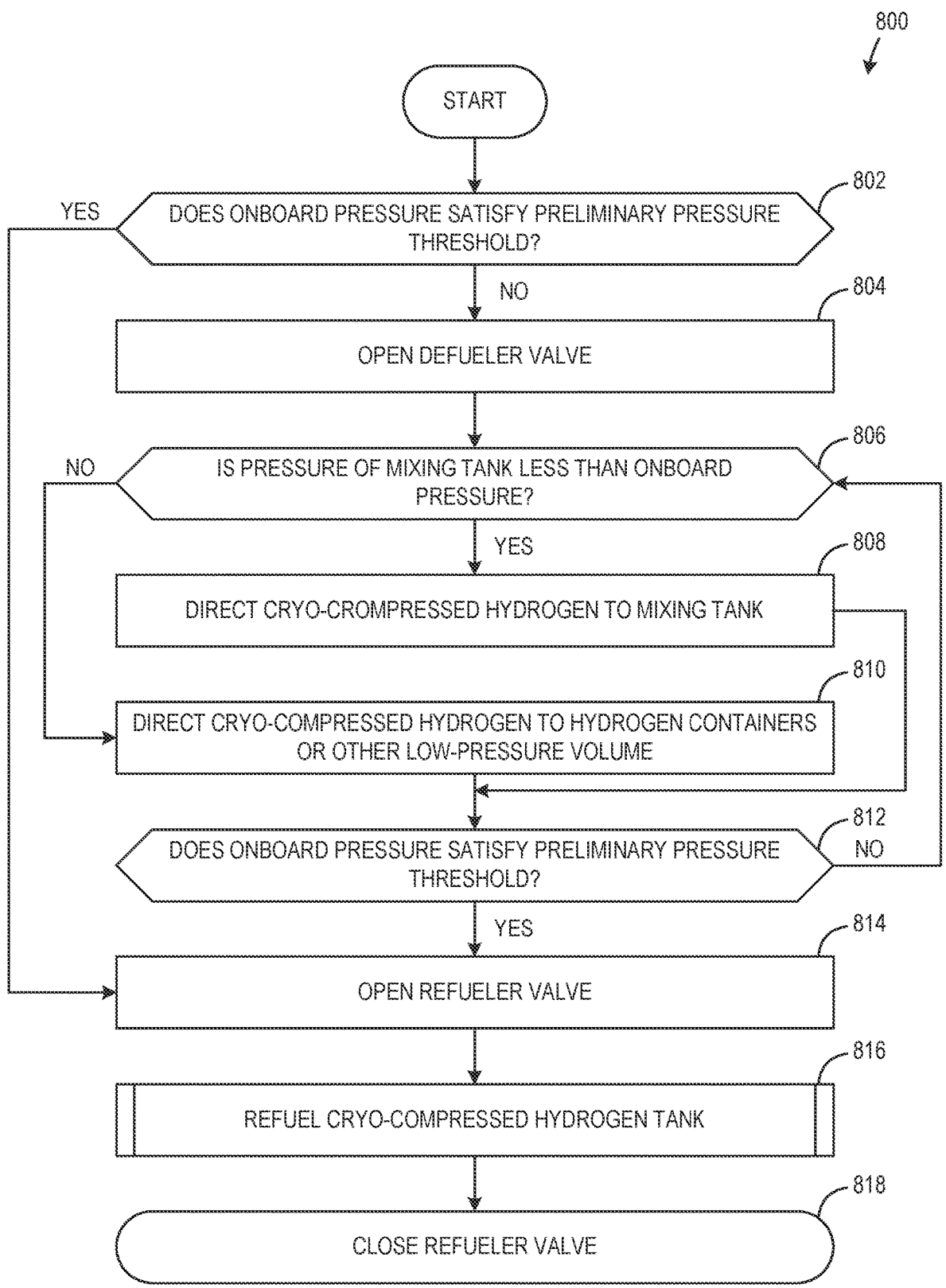
FIG. 8 is a flow diagram illustrating an operation of the example CcH2 refueling systems.

FIG. 8 is a flow diagram illustrating an example process/operation 800 of the CcH2 refueler controller 238 to control operation of the CcH2 refueling systems 200, 300, 400 as disclosed herein. While the example process/operation 800 is described with primary reference to refueling the example onboard CcH2 tank 206 of the example aircraft 204, the process/operation 800 can be used to refuel another CcH2 tank (e.g., the first and/or second CcH2 tanks 512, 514) that may be onboard another hydrogen-powered vehicle, or a standalone CcH2 tank not to be onboard a hydrogen-powered vehicle.

At block 802, the CcH2 refueler controller 238 determines whether an onboard pressure in the onboard CcH2 tank 206 satisfies a preliminary pressure threshold. For example, the pressure loop circuitry 246 requests an onboard pressure measurement from a first pressure sensor 208. When the pressure loop circuitry 246 determines that the onboard pressure does satisfy the preliminary pressure threshold (e.g., if the onboard pressure is below 10 bar), then the process/operation 800 proceeds to block 814.

When the pressure loop circuitry 246 determines that the onboard pressure does not satisfy the preliminary pressure threshold, then the process/operation 800 proceeds to block 804, where the CcH2 refueler controller 238 opens a defueler valve 232. For example, the position loop circuitry 250 sends a signal to an electronically-actuated valve mechanism of the defueler valve 232 that causes flow of the CcH2 in the onboard CcH2 tank 206 to flow to the split valve 234.

At block 806, the CcH2 refueler controller 238 determines whether a pressure of the mixing tank 220 is less than the onboard pressure of the onboard CcH2 tank 206. For example, the pressure loop circuitry 246 continually monitors the onboard pressure via the first pressure sensor 208 and the pressure of the mixing tank 220 via the second pressure sensor 222 and calculates a difference between the two. The pressure loop circuitry 246 can determine that the condition of block 806 is satisfied when the onboard pressure minus the pressure of the mixing tank 220 is a negative value. When the pressure loop circuitry 246 determines that the pressure of the mixing tank 220 is not less than the onboard pressure of the onboard CcH2 tank 206, then the process/operation 800 proceeds to block 810.

When the pressure loop circuitry 246 determines that the pressure of the mixing tank 220 is less than the onboard pressure, then the process/operation 800 proceeds to block 808, where the CcH2 refueler controller 238 causes the split valve 234 to direct the CcH2 flow from the onboard CcH2 tank 206 to the mixing tank 220. For example, the position loop circuitry 250 detects an actual position of a valve mechanism of the split valve 234 and instructs the valve mechanism to actuate to target position that achieves directional flow to the mixing tank 220.

At block 810, when the pressure loop circuitry 246 determines that the pressure of the mixing tank 220 is not less than the onboard pressure, then the CcH2 refueler controller 238 causes the split valve 234 to direct the CcH2 flow from the onboard CcH2 tank 206 to the hydrogen containers 236 or a secondary destination, such as atmosphere. For example, the position loop circuitry 250 detects the actual position of the valve mechanism of the split valve 234 and instructs the valve mechanism to actuate to target position that achieves directional flow to the hydrogen containers 236.

At block 812, the CcH2 refueler controller 238 determines whether the onboard pressure satisfies the preliminary pressure threshold. For example, the pressure loop circuitry 246 reads the onboard pressure measurement from the first pressure sensor 208 and determines if the onboard pressure is less than the predetermined preliminary pressure threshold. When the pressure loop circuitry 246 determines that the onboard pressure does not satisfy the preliminary pressure threshold, then the process/operation 800 returns to block 806.

When the pressure loop circuitry 246 determines that the onboard pressure does satisfy the preliminary pressure threshold, then the process/operation 800 proceeds to block 814, where the CcH2 refueler controller 238 causes the refueler valve 112 to open. For example, the position loop circuitry 250 sends instruction(s) to a valve mechanism of the refueler valve 112 to fully open and permit flow of the CcH2 fuel to the onboard CcH2 tank 206.

Figure 9:
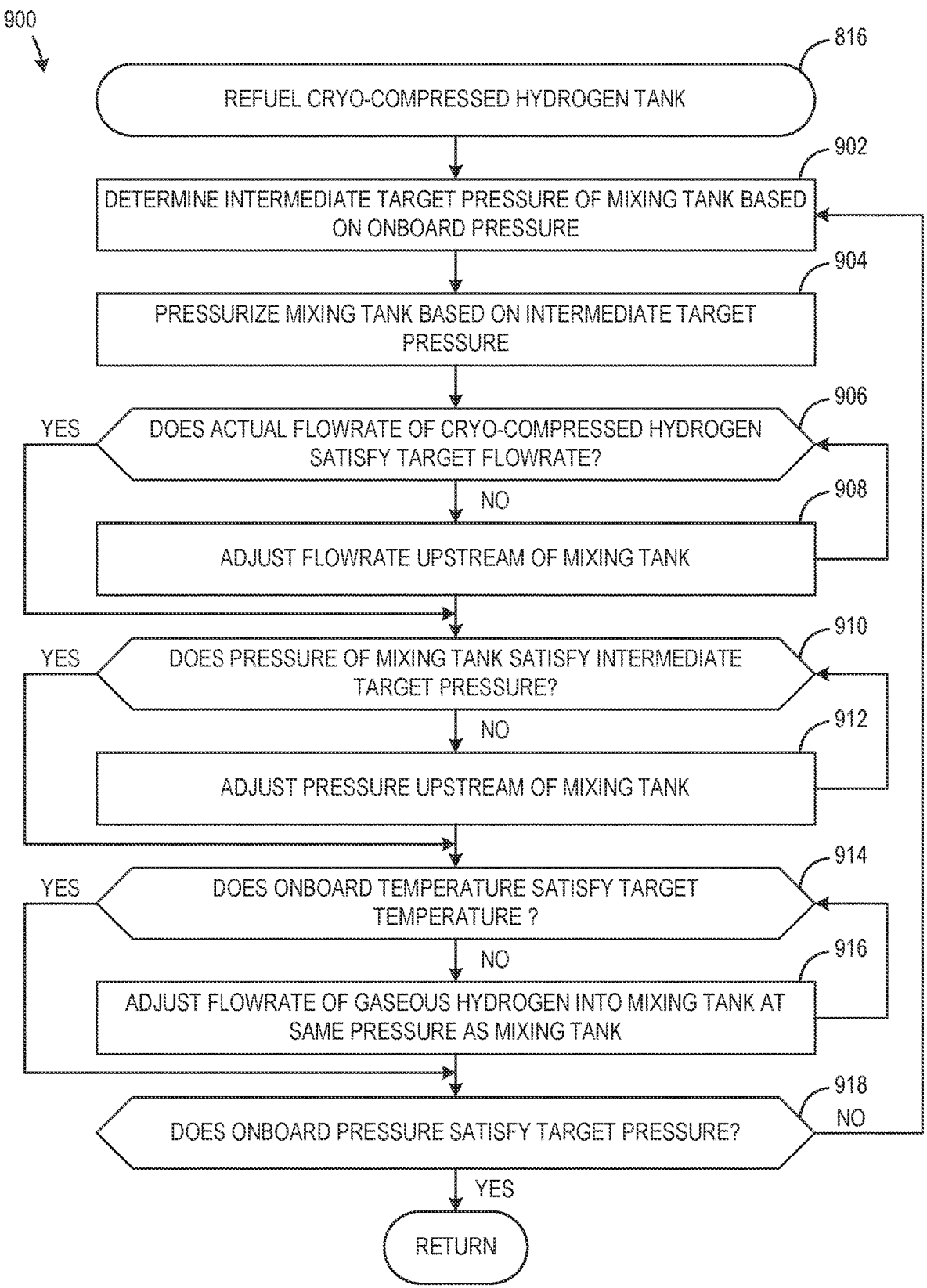
FIG. 9 is a flow diagram illustrating an operation of an example CcH2 refueler of the example CcH2 refueling systems.

At block 816, the example CcH2 refueler 202 facilitates refueling of the onboard CcH2 tank 206 as described in further detail in reference to an example process/operation 900 of FIG. 9.

Once the example process/operation 900 to refuel the onboard CcH2 tank 206 ends, process/operation 800 proceeds to block 818, where the CcH2 refueler controller 238 causes the refueler valve 112 to close. For example, the position loop circuitry 250 instructs the valve mechanism of the refueler valve 112 to fully shut off the flow, at which point the process/operation 800 ends.

FIG. 9 is a flow diagram illustrating the example process/operation 900 of the CcH2 refueler controller 238 to refuel the onboard CcH2 tank 206 via the CcH2 refueler 202. While the example process/operation 900 is described with primary reference to refueling the example onboard CcH2 tank 206 of the example aircraft 204, the process/operation 900 can be used to refuel another CcH2 tank (e.g., the first and/or second CcH2 tanks 512, 514) that may be onboard another hydrogen-powered vehicle, or a standalone CcH2 tank not to be onboard a hydrogen-powered vehicle.

The example process/operation 900 begins at block 902, where the CcH2 refueler controller determines an intermediate target pressure of the mixing tank 220 based on the onboard pressure. For example, the pressure loop circuitry 246 determines, based on written instructions, a set of rules, and/or user input(s), that the intermediate target pressure is to be slightly higher (e.g., 1 bar, 2 bar, 5 bar etc.) than the actual onboard pressure to facilitate a positive pressure head in the systems 200, 300, and/or 400.

At block 904, the CcH2 refueler controller 202 causes pressurization of the mixing tank 220 based on the intermediate target pressure. For example, the position loop circuitry 250 sends instruction(s) to the cryogenic pump 216 to adjust an output pressure to sufficiently match (e.g., within 0.1 bar, 0.05 bar, 0.2 bar, etc.) the intermediate target pressure.

At block 906, the CcH2 refueler controller 202 determines whether an actual flowrate of the CcH2 satisfies a target flowrate. For example, the flowrate loop circuitry 244 calculates a flowrate error between the actual flowrate and the target flowrate, where the actual flowrate is based on a measurement of the flowmeter 110, and the target flowrate is based on the written instruction(s), set of rules, and/or user input(s). When the flowrate loop circuitry 244 determines that the actual flowrate does satisfy the target flowrate (e.g., if the flowrate error is sufficiently near zero (e.g., 0.001 $m^3/s$, 0.0001 $m^3/s$, 0.005 $m^3/s$, etc.)), then the process/operation 900 proceeds to block 910.

When the flowrate loop circuitry 244 determines that the actual flowrate does not satisfy the target flowrate, then the process/operation 900 proceeds to block 908, where the CcH2 refueler controller 238 adjusts the flowrate upstream of the mixing tank 220. For example, the position loop circuitry 250 instructs the pump motor 218 to increase an operation speed or the second regulator valve 304b to increase an output pressure based on the current operational speed and/or current output pressure, the actual flowrate, and/or the target flowrate.

At block 910, the CcH2 refueler controller 238 determines whether the pressure of the mixing tank 220 satisfies the intermediate target pressure. For example, the pressure loop circuitry 246 calculates a pressure error between the mixing tank 220 pressure and the intermediate target pressure and determine if the pressure error is sufficiently close to zero (e.g., 0.1 bar, 0.05 bar, 0.025 bar, etc.). When the pressure loop circuitry 246 determines that the pressure of the mixing tank 220 does satisfy the intermediate target pressure, then process/operation 900 proceeds to block 914.

When the pressure loop circuitry 246 determines that the pressure of the mixing tank 220 does not satisfy the intermediate target pressure, then process/operation 900 proceeds to block 912, where the CcH2 refueler controller 238 adjusts the pressure upstream of the mixing tank 220. For example, the position loop circuitry 250 instructs the cryogenic pump 216 or the second regulator valve 304b to increase an output pressure based on the actual output pressure, the actual pressure of the mixing tank 220, and/or the intermediate target pressure.

At block 914, the CcH2 refueler controller 238 determines whether the onboard temperature satisfies a target temperature of the onboard CcH2 tank 206. For example, the temperature loop circuitry 248 calculates a temperature error between the actual onboard temperature and the target temperature, where the actual temperature is based on a measurement of the first temperature sensor 210, and the target temperature is based on written instruction(s), set of rules, and/or user input(s). When the temperature loop circuitry 248 determines that the actual temperature does satisfy the target temperature (e.g., if the temperature error is sufficiently near zero (e.g., 1 K, 0.5 K, 0.1 K, etc.)), then the process/operation 900 proceeds to block 918.

When the temperature loop circuitry 248 determines that the actual temperature does not satisfy the target temperature, then the process/operation 900 proceeds to block 916, where the CcH2 refueler controller 238 adjusts the flowrate of sH2 into the mixing tank 220. For example, when the temperature loop circuitry 248 determines that the actual temperature is below the target temperature, then the position loop circuitry 250 sends a command to the proportional valve 108 of FIGS. 2-4 to open a valve mechanism of the proportional valve 108 such that the flow of sH2 into the mixing tank 220 sufficiently increases. Alternatively, when the temperature loop circuitry 248 determines that the actual temperature is above the target temperature, then the position loop circuitry 250 sends a command to the proportional valve 108 of FIGS. 2-4 to close the valve mechanism of the proportional valve 108 such that the flow of sH2 into the mixing tank sufficiently decreases. Additionally, the position loop circuitry 250 instructs the regulator valve 304 of FIG. 3 or the first regulator valve 304a of FIG. 4 to set an output pressure upstream of the mixing tank 220 to match the actual pressure of the mixing tank 220.

At block 918, the CcH2 refueler controller 238 determines whether the onboard pressure satisfies a target pressure. For example the pressure loop circuitry 246 calculates a pressure error between the actual onboard pressure and the target pressure, where the actual pressure is based on a measurement of the first pressure sensor 208, and the target pressure is based on written instruction(s), set of rules, and/or user input(s). When the pressure loop circuitry 246 determines that the actual onboard pressure does not satisfy the target pressure (e.g., if the pressure error is sufficiently near zero (e.g., 1 bar, 0.5 bar, 0.1 bar, etc.)), then the process/operation 900 returns to block 902. When the pressure loop circuitry 246 determines that the actual onboard pressure does satisfy the target pressure, then the process/operation 900 returns to block 818 of FIG. 8.

Figure 10:
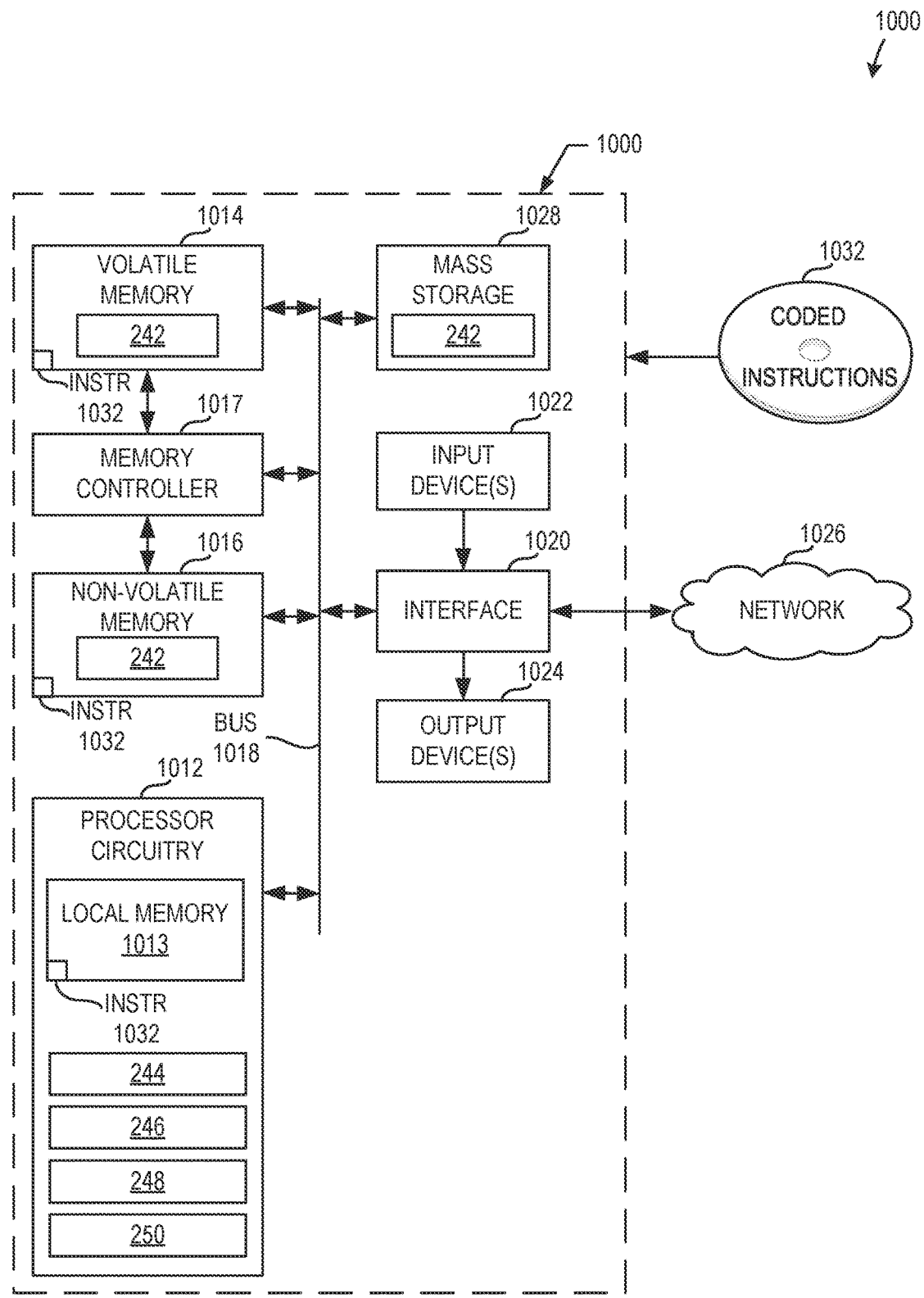
FIG. 10 illustrates an example processing platform including processor circuitry structured to execute the example machine readable instructions of FIGS. 8-9.

FIG. 10 is a block diagram of an example processor platform 1000 structured to execute and/or instantiate the machine readable instructions and/or operations of FIGS. 8 and/or 9 to implement the CcH2 refueler controller 238 of FIGS. 2-4. The processor platform 1000 can be, for example, a server, a personal computer, a workstation, a self-learning machine (e.g., a neural network), a mobile device (e.g., a cell phone, a smart phone, a tablet such as an iPad™), or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example flowrate loop circuitry 244, the example pressure loop circuitry 246, the example temperature loop circuitry 248, and the example position loop circuitry 250.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, a keyboard, a button, a mouse, a touchscreen, a track-pad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), and/or a tactile output device. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine readable instructions of FIGS. 8 and/or 9, may be stored in the mass storage device 1028, in the volatile memory 1014, in the non-volatile memory 1016, and/or on a removable non-transitory computer readable storage medium such as a CD or DVD.

Systems for refueling cryo-compressed hydrogen (CcH2) tanks and methods for operating the same are disclosed herein. The examples disclosed herein refuel CcH2 tanks up to a target pressure while also controlling the temperature of the onboard CcH2 during the refueling process. The examples disclosed herein refuel the example onboard CcH2 tanks at specific temperatures (e.g., 40 K) so that the example onboard pressures satisfy a pressure limit of the onboard CcH2 tanks. The pressure limit (e.g., 100 bar) of the onboard CcH2 tanks may be chosen so that the onboard CcH2 tanks can be designed with fewer structural components and reduced weight (e.g., relative to CcH2 tanks designed with pressure limits of 350 bar).

The examples disclosed herein can be used to refuel onboard CcH2 tank(s) (e.g., the onboard CcH2 tank 206 of FIGS. 2-4, the first and/or second CcH2 tanks 512, 514 of FIG. 5, etc.) and/or other example CcH2 tanks up to the target pressure while controlling the temperature of the CcH2 fuel. During the refuel process with the example CcH2 refueling systems 200, 300, 400, the reverse Joule-Thomson effect of hydrogen causes the temperature of CcH2 in portions of the CcH2 refueling systems 200, 300, 400 and in the onboard CcH2 tank 206 to decrease. At cryogenic temperatures (e.g., CcH2 temperatures of 40 K, 50 K, 70 K, etc.), the Joule-Thomson effect of hydrogen reverses causing hydrogen to cool due to expansion and throttling. In the examples disclosed herein, the CcH2 refueling systems 200, 300, 400 include valves (e.g., the second regulator valve 304b of FIG. 4, the refueler valve 112 of FIGS. 2-4, etc.) or components (e.g., the cryogenic pump 216 of FIGS. 2 and 3, the mixing tank 220 of FIGS. 2-4, etc.) with orifices that can throttle the CcH2 fuel causing expansion and cooling of the CcH2 in portion(s) of the example CcH2 refueling systems 200, 300, and/or 400 and the onboard CcH2 tank 206. The example CcH2 refueling systems 200, 300, 400 disclosed herein mix sH2 with the CcH2 fuel during the refuel process to controllably warm the CcH2 fuel and counteract the reverse Joule-Thomson effect of hydrogen.

Further aspects of the present disclosure are provided by the subject matter of the following clauses:

Example methods, apparatus, systems, and articles of manufacture to sub-cool cryogenic fuel during the refueling of onboard cryogenic fuel tanks are disclosed herein. Further examples and combinations thereof include the following:

Example methods, apparatus, systems, and articles of manufacture to refuel cryo-compressed hydrogen tanks up to a target pressure and at a target temperature are disclosed herein. Further examples and combinations thereof include the following:

Example 1 includes an apparatus to refuel a vessel with cryo-compressed hydrogen, the apparatus comprising a refueler controller configured to defuel the vessel prior to a refuel process based on a pressure of the vessel, fill a mixing tank with at least the cryo-compressed hydrogen based on the pressure of the vessel and a pressure of the mixing tank, wherein the mixing tank is connected upstream of the vessel and is structured to include the cryo-compressed hydrogen, initiate the refuel process of the vessel, adjust a temperature of the mixing tank in response to a temperature of the vessel not satisfying a target temperature of the vessel during the refuel process, wherein the temperature of the mixing tank is to be adjusted based on an increase or a decrease of flow of supercritical hydrogen, and end the refuel process in response to the pressure of the vessel satisfying a target pressure of the vessel.

Example 2 includes the apparatus of any preceding clause, wherein the vessel is a cryo-compressed hydrogen storage tank onboard an aircraft, the vessel to include unused cryo-compressed hydrogen prior to the refuel process.

Example 3 includes the apparatus of any preceding clause, wherein the vessel is a first tank removable from the aircraft, wherein the refueler controller is configured to initiate the refuel process of a second tank detached from the aircraft, the second tank to replace the first tank following the refuel process.

Example 4 includes the apparatus of any preceding clause, further including a first valve and a second valve, the first valve connected to the vessel, the second valve connected to the first valve, the mixing tank, and a secondary destination, wherein the first valve is a quick opening valve, wherein the second valve is a split valve, and wherein the secondary destination includes one or more hydrogen containers.

Example 5 includes the apparatus of any preceding clause, wherein the refueler controller includes pressure loop circuitry to determine if the pressure of the mixing tank is less than the pressure of the vessel, and position loop circuitry to direct, via the second valve, the unused cryo-compressed hydrogen to the mixing tank in response to the pressure of the mixing tank being less than the pressure of the vessel, and direct, via the second valve, the unused cryo-compressed hydrogen to the secondary destination in response to the pressure of the mixing tank being greater than the pressure of the vessel.

Example 6 includes the apparatus of any preceding clause, further including a cryogenic valve connected downstream of the mixing tank and upstream of the vessel, wherein the mixing tank is connected to a cryo-compressed hydrogen source, a supercritical hydrogen source, and the cryogenic valve via one or more rigid vacuum-jacketed flowlines, and wherein the cryogenic valve is connected to the vessel via one or more flexible vacuum jacketed flowlines.

Example 7 includes the apparatus of any preceding clause, further including a cryogenic pump connected to a liquid hydrogen supply tank, wherein the refueler controller includes pressure loop circuitry to determine a target output pressure of the cryogenic pump based on the pressure of the vessel, and position loop circuitry to adjust an output pressure of the cryogenic pump based on the target output pressure of the cryogenic pump.

Example 8 includes the apparatus of any preceding clause, further including a vaporizer connected to the cryogenic pump via a proportional valve, wherein the refueler controller includes temperature loop circuitry to determine a target temperature of the mixing tank based on the temperature of the vessel and the target temperature of the vessel, wherein the position loop circuitry adjusts an output flowrate of the proportional valve based on the target temperature of the mixing tank.

Example 9 includes the apparatus of any preceding clause, further including a proportional valve connected to hydrogen storage tanks and a regulator valve, the proportional valve downstream of the hydrogen storage tanks, the regulator valve downstream of the proportional valve, wherein the refueler controller includes temperature loop circuitry to determine a target temperature of the mixing tank based on the temperature of the vessel and the target temperature of the vessel, pressure loop circuitry to determine a target output pressure of the regulator valve based on the pressure of the mixing tank, and position loop circuitry to adjust an output flowrate of the proportional valve based on the target temperature of the mixing tank, and adjust an output pressure of the regulator valve based on the target output pressure of the regulator valve.

Example 10 includes the apparatus of any preceding clause, further including a regulator valve connected to a cryo-compressed hydrogen supply tank and the mixing tank, the regulator valve downstream of the cryo-compressed hydrogen supply tank, the mixing tank downstream of the regulator valve, wherein the refueler controller includes pressure loop circuitry to determine a target output pressure of the regulator valve based on the pressure of the mixing tank, the pressure of the vessel, or the target pressure of the vessel, and position loop circuitry to adjust an output pressure of the regulator valve based on the target output pressure of the regulator valve.

Example 11 includes at least one non-transitory computer-readable medium comprising instructions that, when executed, cause a refueler controller to at least defuel a vessel prior to a refuel process based on a pressure of the vessel, fill a mixing tank with at least cryo-compressed hydrogen based on the pressure of the vessel and a pressure of the mixing tank, initiate the refuel process of the vessel, adjust a temperature of the mixing tank in response to a temperature of the vessel not satisfying a target temperature of the vessel during the refuel process, wherein the temperature of the mixing tank is to be adjusted based on an increase or a decrease of flow of supercritical hydrogen, and end the refuel process in response to the pressure of the vessel satisfying a target pressure of the vessel.

Example 12 includes the at least one non-transitory computer-readable medium of any preceding clause, further including instructions that cause the refueler controller to defuel the vessel via a first valve connected to the vessel, direct, via a second valve, unused cryo-compressed hydrogen in the vessel to the mixing tank in response to the pressure of the mixing tank being less than the pressure of the vessel, the second valve connected to the first valve, the mixing tank, and a secondary destination, and direct, via the second valve, the unused cryo-compressed hydrogen to the secondary destination in response to the pressure of the mixing tank being greater than the pressure of the vessel, the secondary destination including one or more hydrogen containers.

Example 13 includes the at least one non-transitory computer-readable medium of any preceding clause, wherein the cryo-compressed hydrogen is provided by a cryogenic pump connected to a liquid hydrogen supply tank, and wherein the supercritical hydrogen is provided by a vaporizer connected to the cryogenic pump via a proportional valve, further including instructions that cause the refueler controller to determine a target temperature of the mixing tank based on the temperature of the vessel and the target temperature of the vessel, and adjust an output flowrate of the proportional valve based on the target temperature of the mixing tank.

Example 14 includes the at least one non-transitory computer-readable medium of any preceding clause, wherein a proportional valve is connected to hydrogen storage tanks and a regulator valve, the proportional valve downstream of the hydrogen storage tanks, the regulator valve downstream of the proportional valve, further including instructions that cause the refueler controller to determine a target temperature of the mixing tank based on the temperature of the vessel and the target temperature of the vessel, determine a target output pressure of the regulator valve based on the pressure of the mixing tank, adjust an output flowrate of the proportional valve based on the target temperature of the mixing tank, and adjust an output pressure of the regulator valve based on the target output pressure of the regulator valve.

Example 15 includes the at least one non-transitory computer-readable medium of any preceding clause, wherein a regulator valve is connected to a cryo-compressed hydrogen supply tank and the mixing tank, the regulator valve downstream of the cryo-compressed hydrogen supply tank, the mixing tank downstream of the regulator valve, further including instructions that cause the refueler controller to determine a target output pressure of the regulator valve based on the pressure of the mixing tank, the pressure of the vessel, or the target pressure of the vessel, and adjust an output pressure of the regulator valve based on the target output pressure of the regulator valve.

Example 16 includes a method to refuel a vessel with cryo-compressed hydrogen comprising determining a target pressure of a mixing tank based on a pressure of the vessel, filling the mixing tank with at least the cryo-compressed hydrogen based on the target pressure of the mixing tank, determining whether a flowrate of the cryo-compressed hydrogen satisfies a target flowrate, adjusting the flowrate of the cryo-compressed hydrogen in response to the flowrate not satisfying the target flowrate, determining whether a pressure of the mixing tank satisfies the target pressure of the mixing tank, adjusting the pressure of the mixing tank in response to the pressure not satisfying the target pressure of the mixing tank, determining whether a temperature of the vessel satisfies a target temperature of the vessel, adjusting a flowrate of supercritical hydrogen into the mixing tank at the pressure of the mixing tank based on the temperature of the vessel and the target temperature of the vessel, determining whether the pressure of the vessel satisfies a target pressure of the vessel, and ending a refueling process in response to the pressure of the vessel satisfying the target pressure of the vessel.

Example 17 includes the method of any preceding clause, further including defueling the vessel based on the pressure of the vessel, directing unused cryo-compressed hydrogen in the vessel to the mixing tank in response to the pressure of the mixing tank being less than the pressure of the vessel, and directing the unused cryo-compressed hydrogen to a secondary destination in response to the pressure of the mixing tank being greater than the pressure of the vessel, the secondary destination including one or more hydrogen containers.

Example 18 includes the method of any preceding clause, wherein the cryo-compressed hydrogen is provided by a cryogenic pump connected to a liquid hydrogen supply tank, and wherein the supercritical hydrogen is provided by a vaporizer connected to the cryogenic pump via a proportional valve, further including determining a target temperature of the mixing tank based on the temperature of the vessel and the target temperature of the vessel, and adjusting an output flowrate of the proportional valve based on the target temperature of the mixing tank.

Example 19 includes the method of any preceding clause, wherein a proportional valve is connected to hydrogen storage tanks and a regulator valve, the proportional valve downstream of the hydrogen storage tanks, the regulator valve downstream of the proportional valve, further including determining a target temperature of the mixing tank based on the temperature of the vessel and the target temperature of the vessel, determining a target output pressure of the regulator valve based on the pressure of the mixing tank, adjusting an output flowrate of the proportional valve based on the target temperature of the mixing tank, and adjusting an output pressure of the regulator valve base on the target output pressure of the regulator valve.

Example 20 includes the method of any preceding clause, wherein a regulator valve is connected to a cryo-compressed hydrogen supply tank and the mixing tank, the regulator valve downstream of the cryo-compressed hydrogen supply tank, the mixing tank downstream of the regulator valve, further including determining a target output pressure of the regulator valve based on the pressure of the mixing tank, the pressure of the vessel, or the target pressure of the vessel, and adjusting an output pressure of the regulator valve based on the target output pressure of the regulator valve.

Example 21 includes a system comprising a cryo-compressed hydrogen refueler to refuel a vessel including a mixing tank structured to include cryo-compressed hydrogen, the mixing tank to combine the cryo-compressed hydrogen and supercritical hydrogen, wherein the cryo-compressed hydrogen is sent to the mixing tank at a first temperature and the supercritical hydrogen is sent to the mixing tank at a second temperature greater than the first temperature, and a refueler controller configured to adjust a temperature of the mixing tank in response to a temperature of the vessel not satisfying a target temperature of the vessel during a refuel process, wherein the temperature of the mixing tank is to be adjusted based on an increase or a decrease of flow of supercritical hydrogen.

Example 22 includes the system of any preceding clause, wherein the vessel is a cryo-compressed hydrogen storage tank onboard an aircraft, the vessel to include unused cryo-compressed hydrogen prior to the refuel process.

Example 23 includes the system of any preceding clause, wherein the vessel is a first tank removable from the aircraft, wherein the cryo-compressed hydrogen refueler is to refuel a second tank detached from the aircraft, the second tank to replace the first tank following the refuel process.

Example 24 includes the system of any preceding clause, wherein the cryo-compressed hydrogen refueler includes a first valve and a second valve, the first valve connected to the vessel, the second valve connected to the first valve, the mixing tank, and a secondary destination, wherein the first valve is a quick opening valve, wherein the second valve is a split valve, the secondary destination including one or more hydrogen containers.

Example 25 includes the system of any preceding clause, wherein the refueler controller includes pressure loop circuitry to determine if the pressure of the mixing tank is less than the pressure of the vessel, and position loop circuitry to direct, via the second valve, the unused cryo-compressed hydrogen to the mixing tank in response to the pressure of the mixing tank being less than the pressure of the vessel, and direct, via the second valve, the unused cryo-compressed hydrogen to the secondary destination in response to the pressure of the mixing tank being greater than the pressure of the vessel.

Example 26 includes the system of any preceding clause, further including a cryogenic valve connected downstream of the mixing tank and upstream of the vessel, wherein the mixing tank is connected to a cryo-compressed hydrogen source, a supercritical hydrogen source, and the cryogenic valve via one or more rigid vacuum-jacketed flowlines, and wherein the cryogenic valve is connected to the vessel via one or more flexible vacuum jacketed flowlines.

Example 27 includes the system of any preceding clause, wherein the cryo-compressed hydrogen source is a cryogenic pump connected downstream of a liquid hydrogen supply tank and upstream of the mixing tank, the supercritical hydrogen source is a vaporizer connected downstream of a proportional valve and upstream of the mixing tank, the proportional valve connected downstream of the cryogenic pump.

Example 28 includes the system of any preceding clause, wherein the cryo-compressed hydrogen source is a cryogenic pump connected downstream of a liquid hydrogen supply tank and upstream of the mixing tank, the supercritical hydrogen source is one or more hydrogen storage tanks connected upstream of the mixing tank.

Example 29 includes the system of any preceding clause, wherein the cryo-compressed hydrogen source is a cryo-compressed hydrogen supply tank, the supercritical hydrogen source is one or more hydrogen storage tanks connected upstream of the mixing tank.

Example 30 includes the system of any preceding clause, further including a cryogenic pump connected to a liquid hydrogen supply tank, wherein the refueler controller includes pressure loop circuitry to determine a target output pressure of the cryogenic pump based on the pressure of the vessel, and position loop circuitry to adjust an output pressure of the cryogenic pump based on the target output pressure.

Example 31 includes the system of any preceding clause, further including a vaporizer connected to the cryogenic pump via a proportional valve, wherein the refueler controller includes temperature loop circuitry to determine a target temperature of the mixing tank based on the temperature of the vessel and the target temperature of the vessel, wherein the position loop circuitry adjusts an output flowrate of the proportional valve based on the target temperature of the mixing tank.

Example 32 includes the system of any preceding clause, further including a proportional valve connected to hydrogen storage tanks and a regulator valve, the proportional valve downstream of the hydrogen storage tanks, the regulator valve downstream of the proportional valve, wherein the refueler controller includes temperature loop circuitry to determine a target temperature of the mixing tank based on the temperature of the vessel and the target temperature of the vessel, pressure loop circuitry to determine a target output pressure of the regulator valve based on the pressure of the mixing tank, and position loop circuitry to adjust an output flowrate of the proportional valve based on the target temperature of the mixing tank, and adjust an output pressure of the regulator valve based on the target output pressure of the regulator valve.

Example 33 includes the system of any preceding clause, further including a regulator valve connected to a cryo-compressed hydrogen supply tank and the mixing tank, the regulator valve downstream of the cryo-compressed hydrogen supply tank, the mixing tank downstream of the regulator valve, wherein the refueler controller includes pressure loop circuitry to determine a target output pressure of the regulator valve based on the pressure of the mixing tank, the pressure of the vessel, or the target pressure, and position loop circuitry to adjust the output pressure of the regulator valve based on the target output pressure.

The following claims are hereby incorporated into this Detailed Description by this reference, with each claim standing on its own as a separate embodiment of the present disclosure.

What is claimed is:

1. An apparatus to refuel a vessel with cryo-compressed hydrogen, the apparatus comprising:
   a mixing tank structured to include the cryo-compressed hydrogen, the mixing tank coupled to the vessel, a cryo-compressed hydrogen source, and a supercritical hydrogen source;
   a first valve coupled to the mixing tank and the vessel, the first valve positioned downstream of the vessel and upstream of the mixing tank;
   a second valve coupled to the mixing tank and the vessel, the second valve positioned downstream of the mixing tank and upstream of the vessel;
   a third valve coupled to the mixing tank and the supercritical hydrogen source; and
   a refueler controller configured to:
      open the first valve to defuel the vessel prior to a refuel process based on a pressure of the vessel;
      cause the mixing tank to fill with at least the cryo-compressed hydrogen based on the pressure of the vessel and a pressure of the mixing tank;
      open the second valve to initiate the refuel process of the vessel;
      cause the third valve to increase or decrease a flow of supercritical hydrogen from the supercritical hydrogen source to the mixing tank to adjust a temperature of the mixing tank in response to a temperature of the vessel not satisfying a target temperature of the vessel during the refuel process; and
      close the second valve to end the refuel process in response to the pressure of the vessel satisfying a target pressure of the vessel.

2. The apparatus of claim 1, wherein the vessel is a cryo-compressed hydrogen storage tank to be positioned onboard an aircraft, the vessel to include unused cryo-compressed hydrogen prior to the refuel process.

3. The apparatus of claim 2, wherein the vessel is a first vessel configured to be removable from the aircraft, wherein the refueler controller is configured to initiate the refuel process of a second vessel different than the first vessel, the second vessel to replace the first vessel and to be positioned onboard the aircraft following the refuel process.

4. The apparatus of claim 1, further including a fourth valve coupled to the first valve, the mixing tank, and a secondary destination, the first valve being a quick opening valve, the fourth valve being a split valve, the secondary destination including one or more hydrogen containers.

5. The apparatus of claim 4, wherein the refueler controller includes:
   pressure loop circuitry to determine whether the pressure of the mixing tank is less than the pressure of the vessel; and
   position loop circuitry to:
      direct, via the fourth valve, unused cryo-compressed hydrogen from the vessel to the mixing tank in response to the pressure of the mixing tank being less than the pressure of the vessel; and
      direct, via the fourth valve, the unused cryo-compressed hydrogen to the secondary destination in response to the pressure of the mixing tank being greater than the pressure of the vessel.

6. The apparatus of claim 1, wherein the second valve is a cryogenic valve, the mixing tank to be connected to a the cryogenic valve, the cryogenic valve to be connected to the vessel via a vacuum jacketed flowline.

7. The apparatus of claim 1, further including a cryogenic pump to be connected to a liquid hydrogen supply tank, the refueler controller including:
   pressure loop circuitry to determine a target output pressure of the cryogenic pump based on the pressure of the vessel; and
   position loop circuitry to adjust an output pressure of the cryogenic pump based on the target output pressure of the cryogenic pump.

8. The apparatus of claim 7, further including a vaporizer connected to the cryogenic pump via the third valve, the refueler controller including temperature loop circuitry to determine a target temperature of the mixing tank based on the temperature of the vessel and the target temperature of the vessel, the position loop circuitry to adjust an output flowrate of the third valve based on the target temperature of the mixing tank.

9. The apparatus of claim 1, wherein the third valve is to be connected to hydrogen storage tanks and a regulator valve, the third valve to be positioned downstream of the hydrogen storage tanks, the regulator valve positioned downstream of the third valve, the refueler controller including:
  temperature loop circuitry to determine a target temperature of the mixing tank based on the temperature of the vessel and the target temperature of the vessel;
  pressure loop circuitry to determine a target output pressure of the regulator valve based on the pressure of the mixing tank; and
  position loop circuitry to:
    adjust an output flowrate of the third valve based on the target temperature of the mixing tank; and
    adjust an output pressure of the regulator valve based on the target output pressure of the regulator valve.

10. The apparatus of claim 9, wherein the regulator valve is a first regulator valve, further including a second regulator valve to be connected to a cryo-compressed hydrogen supply tank and the mixing tank, the second regulator valve to be positioned downstream of the cryo-compressed hydrogen supply tank, the mixing tank positioned downstream of the second regulator valve, and wherein:
  the pressure loop circuitry to determine a target output pressure of the second regulator valve based on the pressure of the mixing tank, the pressure of the vessel, or the target pressure of the vessel; and
  the position loop circuitry to adjust an output pressure of the second regulator valve based on the target output pressure of the second regulator valve.

11. At least one non-transitory computer-readable medium comprising instructions that, when executed, cause a refueler controller to at least:
  open a first valve to defuel a vessel prior to a refuel process based on a pressure of the vessel;
  cause a mixing tank to fill with at least cryo-compressed hydrogen based on the pressure of the vessel and a pressure of the mixing tank;
  open a second valve to initiate the refuel process of the vessel;
  cause a third valve to increase or decrease a flow of supercritical hydrogen from a supercritical hydrogen source to the mixing tank to adjust a temperature of the mixing tank in response to a temperature of the vessel not satisfying a target temperature of the vessel during the refuel process; and
  close the second valve to end the refuel process in response to the pressure of the vessel satisfying a target pressure of the vessel.

12. The at least one non-transitory computer-readable medium of claim 11, further including instructions that cause the refueler controller to:
  determine whether the pressure of the mixing tank is less than the pressure of the vessel;
  direct, via a fourth valve, unused cryo-compressed hydrogen from the vessel to the mixing tank in response to the pressure of the mixing tank being less than the pressure of the vessel, the fourth valve connected to the first valve, the mixing tank, and a secondary destination; and
  direct, via the fourth valve, the unused cryo-compressed hydrogen to the secondary destination in response to the pressure of the mixing tank being greater than the pressure of the vessel, the secondary destination including one or more hydrogen containers.

13. The at least one non-transitory computer-readable medium of claim 11, wherein the cryo-compressed hydrogen is provided by a cryogenic pump connected to a liquid hydrogen supply tank, the supercritical hydrogen provided by a vaporizer connected to the cryogenic pump via the third valve, further including instructions that cause the refueler controller to:
  determine a target temperature of the mixing tank based on the temperature of the vessel and the target temperature of the vessel; and
  adjust an output flowrate of the third valve based on the target temperature of the mixing tank.

14. The at least one non-transitory computer-readable medium of claim 11, wherein the third valve is to be connected to hydrogen storage tanks and a regulator valve, the third valve to be positioned downstream of the hydrogen storage tanks, the regulator valve positioned downstream of the third valve, further including instructions that cause the refueler controller to:
  determine a target temperature of the mixing tank based on the temperature of the vessel and the target temperature of the vessel;
  determine a target output pressure of the regulator valve based on the pressure of the mixing tank;
  adjust an output flowrate of the third valve based on the target temperature of the mixing tank; and
  adjust an output pressure of the regulator valve based on the target output pressure of the regulator valve.

15. The at least one non-transitory computer-readable medium of claim 14, wherein the regulator valve is a first regulator valve, and a second regulator valve is to be connected to a cryo-compressed hydrogen supply tank and the mixing tank, the second regulator valve to be positioned downstream of the cryo-compressed hydrogen supply tank, the mixing tank positioned downstream of the second regulator valve, further including instructions that cause the refueler controller to:
  determine a target output pressure of the second regulator valve based on the pressure of the mixing tank, the pressure of the vessel, or the target pressure of the vessel; and
  adjust an output pressure of the second regulator valve based on the target output pressure of the second regulator valve.

16. A method to refuel a vessel with cryo-compressed hydrogen comprising:
  determining a target pressure of a mixing tank based on a pressure of the vessel;
  filling the mixing tank with at least the cryo-compressed hydrogen based on the target pressure of the mixing tank;
  determining whether a flowrate of the cryo-compressed hydrogen satisfies a target flowrate;
  adjusting the flowrate of the cryo-compressed hydrogen in response to the flowrate not satisfying the target flowrate;
  determining whether a pressure of the mixing tank satisfies the target pressure of the mixing tank;
  adjusting the pressure of the mixing tank in response to the pressure not satisfying the target pressure of the mixing tank;
  determining whether a temperature of the vessel satisfies a target temperature of the vessel;

adjusting a flowrate of supercritical hydrogen into the mixing tank at the pressure of the mixing tank based on the temperature of the vessel and the target temperature of the vessel;

determining whether the pressure of the vessel satisfies a target pressure of the vessel; and ending a refueling process in response to the pressure of the vessel satisfying the target pressure of the vessel.

17. The method of claim 16, further including:

defueling the vessel based on the pressure of the vessel;

directing unused cryo-compressed hydrogen in the vessel to the mixing tank in response to the pressure of the mixing tank being less than the pressure of the vessel; and directing the unused cryo-compressed hydrogen to a secondary destination in response to the pressure of the mixing tank being greater than the pressure of the vessel, the secondary destination including one or more hydrogen containers.

18. The method of claim 16, wherein the cryo-compressed hydrogen is provided by a cryogenic pump connected to a liquid hydrogen supply tank, and wherein the supercritical hydrogen is provided by a vaporizer connected to the cryogenic pump via a proportional valve, further including:

determining a target temperature of the mixing tank based on the temperature of the vessel and the target temperature of the vessel; and adjusting an output flowrate of the proportional valve based on the target temperature of the mixing tank.

19. The method of claim 16, wherein a proportional valve is to be connected to hydrogen storage tanks and a regulator valve, the proportional valve to be positioned downstream of the hydrogen storage tanks, the regulator valve positioned downstream of the proportional valve, further including:

determining a target temperature of the mixing tank based on the temperature of the vessel and the target temperature of the vessel;

determining a target output pressure of the regulator valve based on the pressure of the mixing tank;

adjusting an output flowrate of the proportional valve based on the target temperature of the mixing tank; and adjusting an output pressure of the regulator valve based on the target output pressure of the regulator valve.

20. The method of claim 19, wherein the regulator valve is a first regulator valve, and a second regulator valve is to be connected to a cryo-compressed hydrogen supply tank and the mixing tank, the second regulator valve to be positioned downstream of the cryo-compressed hydrogen supply tank, the mixing tank downstream positioned of the second regulator valve, further including:

determining a target output pressure of the second regulator valve based on the pressure of the mixing tank, the pressure of the vessel, or the target pressure of the vessel; and adjusting an output pressure of the second regulator valve based on the target output pressure of the second regulator valve.

* * * * *